United States Patent
Lee et al.

(10) Patent No.: US 7,944,833 B2
(45) Date of Patent: May 17, 2011

(54) END-TO-END QOS INTEROPERATION APPARATUS AND METHOD IN HETEROGENEOUS NETWORK ENVIRONMENT

(75) Inventors: Sung-Hyuck Lee, Daegu-si (KR);
Jong-Ho Bang, Suwon-si (KR);
Seong-Ho Jeong, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1316 days.

(21) Appl. No.: 11/434,785

(22) Filed: May 17, 2006

(65) Prior Publication Data
US 2006/0262803 A1 Nov. 23, 2006

Related U.S. Application Data

(60) Provisional application No. 60/681,471, filed on May 17, 2005.

(30) Foreign Application Priority Data

May 16, 2006 (KR) .................. 10-2006-0043804

(51) Int. Cl.
*G01R 31/08* (2006.01)
(52) U.S. Cl. .................. 370/235; 370/238; 370/329
(58) Field of Classification Search .................. 370/235, 370/238, 329, 401, 466, 467; 709/203, 226, 709/238, 223–224; 455/406
See application file for complete search history.

(56) References Cited

U.S. PATENT DOCUMENTS

| | | | |
|---|---|---|---|
| 6,708,034 B1 | 3/2004 | Sen et al. | |
| 6,738,816 B1* | 5/2004 | Momona | 709/226 |
| 2002/0068545 A1* | 6/2002 | Oyama et al. | 455/406 |
| 2002/0147828 A1* | 10/2002 | Chen et al. | 709/231 |
| 2003/0108015 A1* | 6/2003 | Li | 370/338 |
| 2003/0161284 A1* | 8/2003 | Chen | 370/331 |
| 2003/0208582 A1* | 11/2003 | Persson et al. | 709/223 |
| 2004/0125748 A1* | 7/2004 | Hurtta et al. | 370/230 |
| 2004/0260750 A1* | 12/2004 | Ruutu et al. | 709/200 |
| 2005/0094611 A1 | 5/2005 | Cheong et al. | |
| 2007/0217349 A1* | 9/2007 | Fodor et al. | 370/310.2 |

FOREIGN PATENT DOCUMENTS
KR  10-2002-58404  7/2002

OTHER PUBLICATIONS
Robert Hancock, NSIS Working Group Internet Draft, Jun. 2003.*

* cited by examiner

*Primary Examiner* — Ricky Ngo
*Assistant Examiner* — Iqbal Zaidi
(74) *Attorney, Agent, or Firm* — NSIP Law

(57) ABSTRACT

An end-to-end quality-of-service (QoS) interoperation apparatus and method in a heterogeneous network environment are provided. A Next Steps In Signaling (NSIS) Application Programming Interface (NAPI) block handles an NSIS API at the request of an upper layer. An NSIS entity handles an NSIS protocol stack at the request of the NAPI block. An Internet Protocol Bearer Service (IP BS) manager manages an IP BS. A translation block translates parameters of a 3GPP_CLASS object and a UMTS QoS class predefined in an NSIS message according to a predetermined mapping configuration. A memory stores a software application including a Universal Mobile Telecommunication System Bearer Service (UMTS BS) manager for managing a UMTS BS. A processor combined with the memory, controls the software application.

32 Claims, 15 Drawing Sheets

END-TO-END QOS INTEROPERATION APPARATUS AND METHOD IN HETEROGENEOUS NETWORK ENVIRONMENT

PRIORITY

This application claims the benefit under 35 U.S.C. §119(e) of application Ser. No. 60/681,471 filed in the United States Patent and Trademark Office on May 17, 2005, and claims the benefit under 35 U.S.C. §119(a) of application Serial No. 2006-43804 filed in the Korean Intellectual Property Office on May 16, 2006, the entire disclosures of both of which are hereby incorporated by reference.

BACKGROUND OF THE INVENTION

1. Field of the Invention

The present invention relates generally to an end-to-end quality-of-service (QoS) interoperation method in a heterogeneous network environment. In particular, the present invention relates to an end-to-end QoS interoperation method between a 3rd Party Partnership Project (3GPP) network and a non-3GPP network in a heterogeneous network environment.

2. Description of the Related Art

A configuration of the next generation communication network is expected to assume a form in which various types of wire/wireless networks coexist, centering around a core network. In the heterogeneous network environment where heterogeneous networks are connected to each other, in order to effectively support multimedia service quality, there is a need for consistent end-to-end QoS control architecture and signaling technology.

Of the conventional QoS related protocols, IEFT Next Steps In Signaling (NSIS) has no QoS interoperation technique with a 3GPP network. International Telecommunication Union-Telecom (ITU-T) H.360 (an architecture for End-to-End QoS Control and Signaling) presents an end-to-end QoS architecture but fails to present a detailed QoS signaling procedure provided taking the detailed network into account. In addition, 3GPP Technical Specification (TS) 23.107 and TS 23.207 present signaling limited to the 3GPP network, and merely present a part of the signaling procedure for the use of Resource Reservation Protocol (RSVP). That is, because 3GPP TS 23.107 and TS 23.207 do not specify the use of the RSVP in an Internet Protocol (IP)-based Universal Mobile Telecommunication System (UMTS) network, the RSVP is not initiated in a Gateway General Packet Radio Service (GPRS) Support Node (GGSN) and a User Equipment (UE) executes an RSVP message after performing a Packet Data Protocol (PDP) Context Activation procedure, causing a reduction in the speed of resource reservation. In addition, the RSVP, as it does not have a configuration for delivering 3GPP QoS information, does not support mobility, has a low-extendability problem, and has difficulty in supporting QoS between heterogeneous networks.

The possible problems of the QoS signaling scheme in the current 3GPP network are as follows. First, the QoS signaling scheme cannot transport 3GPP QoS information between the ends. Second, PDP context signaling is limited only to one UMTS network. Third, there is a need for an efficient IP level signaling protocol used in an All IP-based UMTS network. Fourth, there is no protocol for QoS support between a 3GPP network and a heterogeneous network.

Therefore, the foregoing problems cause QoS resource reservation of the receiving-side 3GPP network not to be performed in a required level, make IP level resource reservation of the All IP-base UMTS network difficult, and make end-to-end QoS support difficult in the environment where a 3GPP network and a non-3GPP network coexist.

Accordingly, there is a need for an improved end-to-end QOS interoperation apparatus and method for use in a heterogeneous network environment.

SUMMARY OF THE INVENTION

Exemplary embodiments of the present invention address at least the above problems and/or disadvantages and provide at least the advantages described below. Accordingly, an aspect of the present invention to provide a QoS interoperation method between a 3GPP network and a non-3GPP network, for receiving a corresponding service by delivering QoS requirements to a network so as to satisfy various QoS requirements of a multimedia application in a heterogeneous network environment.

It is another object of the present invention to provide an interoperation method between an Y.1541 QoS Model (QOSM) and a UMTS QOSM of ITU-T in a heterogeneous network environment, and an interoperation method between DiffServ QOSM and UMTS QOSM of IETF.

According to one exemplary aspect of the present invention, there is provided an end-to-end quality-of-service (QoS) interoperation apparatus in a heterogeneous network environment. The apparatus comprises a Next Steps In Signaling (NSIS) Application Programming Interface (NAPI) block for handling an NSIS API at the request of an upper layer, an NSIS entity for handling an NSIS protocol stack at the request of the NAPI block, an Internet Protocol Bearer Service (IP BS) manager for managing an IP BS, a translation block for translating parameters of a 3GPP_CLASS object and a UMTS QoS class in an NSIS message according to a predetermined mapping configuration; a memory for storing a software including a Universal Mobile Telecommunication System Bearer Service (UMTS BS) manager for managing a UMTS BS and a processor combined with the memory, for controlling the software.

According to another exemplary aspect of the present invention, there is provided an end-to-end quality-of-service (QoS) interoperation method initiated by a first user equipment (UE), performed between a first Universal Mobile Telecommunication System (UMTS) network including the first UE and a first Gateway GPRS Support Node (GGSN) and a second UMTS network including a second UE and a second GGSN via an Y.1541Diffserv-based IP network. The method comprises, upon receiving a QoS requirement from an upper application layer, generating, by the first UE, a QUERY/RESERVE message including a 3GPP_CLASS object and transmitting the QUERY/RESERVE message to the first GGSN, transmitting, by the first GGSN, a QUERY/RESERVE message including a 3GPP_CLASS object to the second GGSN via the Y.1541Diffserv-based IP network, transmitting, by the second GGSN, the QoS QUERY/RESERVE message including the 3GPP_CLASS object received from the first GGSN to the second UE, performing, by the second UE, QoS mapping according to a mapping configuration, and then performing a Packet Data Protocol (PDP) context activation process with the second GGSN, generating, by the second UE, a QoS RESERVE/RESPONSE message including a 3GPP_CLASS object, and transmitting the QoS RESERVE/RESPONSE message to the second GGSN, transmitting, by the second GGSN, the QoS RESERVE/RESPONSE message including the 3GPP_CLASS object to the first GGSN, transmitting, by the first GGSN, the QoS RESERVE/RESPONSE message including the 3GPP_CLASS object received from the second GGSN to the first UE, performing, by the first UE, QoS mapping according to a mapping configuration, and then performing a PDP context activation process with the first GGSN, thereby securing end-to-end QoS and performing end-to-end exchange of multimedia traffic through the secured resource.

According to further another exemplary aspect of the present invention, there is provided an end-to-end quality-of-service (QoS) interoperation method initiated by a first Gateway GPRS Support Node (GGSN), performed between a first Universal Mobile Telecommunication System (UMTS) network including a first user equipment (UE) and a first GGSN and a second UMTS network including a second UE and a second GGSN via an Y.1541Diffserv-based IP network. The method comprises, performing, by the first UE, QoS mapping according to a mapping configuration, and then performing a Packet Data Protocol (PDP) context activation process with the first GGSN, performing, by the first GGSN, QoS mapping according to a mapping configuration, and then generating a QUERY/RESERVE message including a 3GPP_CLASS object and transmitting the QUERY/RESERVE message to the second GGSN via the Y.1541Diffserv-based IP network, transmitting, by the second GGSN, the QoS QUERY/RESERVE message including the 3GPP_CLASS object received from the first GGSN to the second UE; performing, by the second UE, QoS mapping according to a mapping configuration, and then performing a PDP context activation process between the second GGSN and the first UE, generating, by the second UE, a QoS RESERVE/RESPONSE message including a 3GPP_CLASS object and transmitting the QoS RESERVE/RESPONSE to the second GGSN, performing, by the second GGSN2, QoS mapping according to a mapping configuration, and then transmitting the QoS RESERVE/RESPONSE message including the 3GPP_CLASS object to the first GGSN, transmitting, by the first GGSN, the QoS RESERVE/RESPONSE message including the 3GPP_CLASS object received from the second GGSN to the first UE, thereby securing resources and performing end-to-end exchange of multimedia traffic through the secured resource.

According to yet another exemplary aspect of the present invention, there is provided an end-to-end quality-of-service (QoS) interoperation method of a user equipment (UE) in a heterogeneous network environment. The method comprises, upon receiving a QoS request from an upper application, determining whether a corresponding QoS Model (QOSM) is a UMTS QOSM or an Y.1541Diffserv QOSM, if the corresponding QOSM is a UMTS QOSM, generating a 3GPP_CLASS object and translating the 3GPP_CLASS object into parameters of a UMTS QoS class according to a mapping configuration, and if the corresponding QOSM is an Y.1541Diffserv QOSM, generating a Y.1541Diffserv parameter and translating the Y.1541Diffserv parameter into parameters of the UMTS QoS class according to a predetermined mapping configuration, transmitting the translated UMTS QoS class to a UMTS network, receiving the UMTS QoS class from the LMTS network, and determining a corresponding QOSM is a UMTS QOSM or an Y.1541Diffserv QOSM, if the corresponding QOSM is a UMTS QOSM, translating parameters of a UMTS QoS class into a 3GPP_CLASS object according to a mapping configuration and generating a 3GPP_CLASS object, and if the corresponding QOSM is an Y.1541Diffserv QOSM, translating parameters of a UMTS QoS class into an Y.1541Diffserv parameter according to a mapping configuration and generating an Y.1541Diffserv parameter and performing QoS handling by analyzing the generated parameter.

According to still another exemplary aspect of the present invention, there is provided an end-to-end quality-of-service (QoS) interoperation method of a Gateway GPRS Support Node (GGSN) in a heterogeneous network environment. The method comprises, upon receiving a Next Steps In Signaling (NSIS) message from an Internet Protocol (IP) network, determining whether a corresponding QoS Model (QOSM) is a Universal Mobile Telecommunication System (UMTS) QOSM or an Y.1541Diffserv QOSM, if the corresponding QOSM is a UMTS QOSM, translating a 3GPP_CLASS object in the NSIS message into parameters of a UMTS QoS class according to a mapping configuration, and if the corresponding QOSM is an Y.1541Diffserv QOSM, translating an Y.1541Diffserv parameter into parameters of a UMTS QoS class according to a mapping configuration, performing a Packet Data Protocol (PDP) context activation process, and transmitting the translated UMTS QoS class to a UMTS network, upon receiving a UMTS QoS class from the UMTS network, performing a PDP context activation process, determining whether a corresponding QOSM is a UMTS QOSM or an Y.1541Diffserv QOSM, if the corresponding QOSM is a UMTS QOSM, translating parameters of the UMTS QoS class into a 3GPP_CLASS parameter according to a mapping configuration and generating a 3GPP_CLASS object using the translated 3GPP_CLASS parameter, and if the corresponding QOSM is an Y.1541Diffserv QOSM, translating parameters of the UMTS QoS class into a 3GPP_CLASS parameter according to a mapping configuration and generating an Y.1541Diffserv parameter using the translated 3GPP_ CLASS parameter and transmitting the generated 3GPP_CLASS object or Y.1541Diffserv parameter to the IP network.

BRIEF DESCRIPTION OF THE DRAWINGS

The above and other objects, features and advantages of certain embodiments of the present invention will become more apparent from the following detailed description when taken in conjunction with the accompanying drawings in which.

DETAILED DESCRIPTION OF EXEMPLARY EMBODIMENTS

Figure 1:
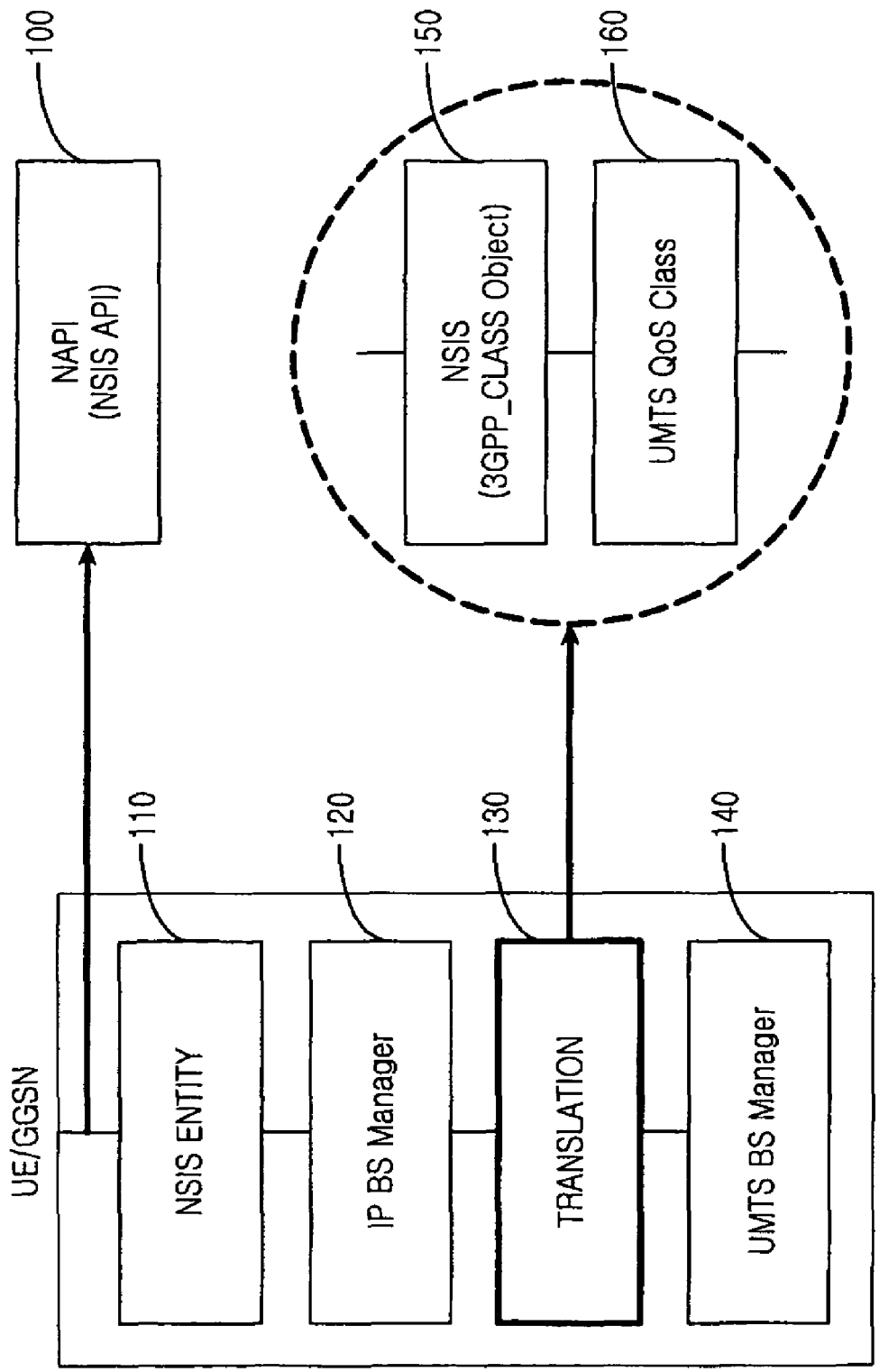
FIG. 1 is a diagram illustrating a QoS handling block included in a UE or a GGSN according to an exemplary embodiment of the present invention.

Several exemplary embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

A summary of exemplary embodiments of the present invention will first be made below.

First, a UE according to an exemplary embodiment of the present invention generates an NSIS signaling message to provide a mapping function between a UMTS QOSM and an Y.1541DiffServ QOSM. That is, the UE generates a 3GPP_CLASS object to transport QoS parameters. In addition, the present invention uses UE-initiated signaling, and reserves the required resources by delivering sending-side UMTS QoS information to a receiving-side UMTS, thereby consistently achieving QoS resource reservation (the conventional RSVP does not transport QoS parameters of UMTS QOSM).

Second, a GGSN according to an exemplary embodiment of the present invention can perform QoS interoperation between a UMTS QOSM and an Y.1541DiffServ QOSM for interoperation with an Y.1541DiffServ-based network. The DiffServ-UMTS QoS interoperation achieves signaling by performing QoS mapping in the GGSN. The Y.1541-UMTS QoS interoperation also achieves signaling by performing QoS mapping in the GGSN. That is, the GGSN according to an exemplary embodiment of the present invention generates a 3GPP_CLASS object to transport QoS parameters. In addition, the exemplary embodiment of present invention can rapidly perform QoS resource reservation using GGSN-initiated signaling (conventionally, because the GGSN cannot receive the 3GPP QoS parameters from the external network, the GGSN has difficulty in initiating the signaling for correct QoS resource reservation).

Third, an exemplary embodiment of present invention can effectively achieve QoS interoperation between a non-3GPP network and a 3GPP network by defining additional QOSM parameters for UMTS QOSM. That is, the 3GPP-QOSM can initiate PDP context signaling using QoS class/parameters of the 3GPP network, transported through the 3GPP_CLASS object, or select the optimal one of the preset PDP contexts.

Fourth, an exemplary embodiment of present invention supports both a Receiver-initiated scheme and a Sender-Initiated scheme defined in NSIS. That is, as to a difference from the operation procedure defined in 3GPP TS 23.207, the present invention initiates QoS signaling for QoS interoperation in each of the UE and the GGSN, and supports not only a Receiver-oriented scheme but also a Sender-oriented scheme.

Fifth, an exemplary embodiment of present invention can reserve resources using NSIS signaling for IP-based delivery within a UMTS network in an All IP environment, and achieve signaling by changing the UMTS QOSM into various types of QOSMs (Diffserv-QOSM or Y.1541-QOSM). In 3GPP TS, there is no mention of the signaling for reserving resources in the IP-based UMTS network, and RSVP is mentioned during signaling with the external network.

Sixth, in an exemplary embodiment of present invention, when both of the UE and the GGSN are NSIS signaling nodes, the UE derives QoS requirements of an application and maps the QoS requirements to QoS parameters in the 3GPP_CLASS object. If the UE initiates PDP context signaling and transmits a PDP context signaling message instead of the NSIS message to the GGSN, the GGSN generates a 3GPP_CLASS object and immediately initiates NSIS signaling. If the UE transmits the NSIS message including the 3GPP_CLASS object instead of the PDP context signaling message, the GGSN receives the NSIS message and delivers the received NSIS message to the next signaling node. In this case, the GGSN performs mapping such that QoS parameters appropriate for adjacent networks may be derived.

Seventh, in the exemplary embodiment of the present invention, if only the UE is an NSIS signaling node, the UE derives QoS requirements of an application and maps the QoS requirements to QoS parameters in the 3GPP_CLASS object. The UE delivers an NSIS message to a peer of the external network where the NSIS is installed, thereby performing signaling up to the receiving side.

Eighth, in an exemplary embodiment of the present invention, if only the GGSN is an NSIS signaling node, the UE initiates PDP context signaling and transmits a PDP context signaling message to the GGSN. Then the GGSN generates a 3GPP_CLASS object and immediately initiates NSIS signaling.

With reference to the accompanying drawings, a detailed description will now be made of the above-stated exemplary embodiments of the present invention.

FIG. 1 is a diagram illustrating a QoS handling block included in a UE or a GGSN according to an exemplary embodiment of the present invention.

Referring to FIG. 1, a UE or a GGSN includes an NSIS Application Programming Interface (NAPI) 100, a NSIS entity 110, an IP Bearer Service (BS) Manager 120, a translation block 130, and a UMTS Bearer Service (BS) Manager 140.

The NAPI 100 is a block for handling NSIS API. The NSIS entity 110 corresponds to an NSIS protocol stack. The IP BS Manager 120 manages IP BS.

The translation block 130 takes charge of a core role for end-to-end QoS interoperation in a heterogeneous network environment, and translates parameters of an NSIS (3GPP_CLASS Object) 150 and a UMTS QoS Class 160 according to a mapping configuration. The UMTS BS Manager 140 manages UMTS BS.

Figure 2:
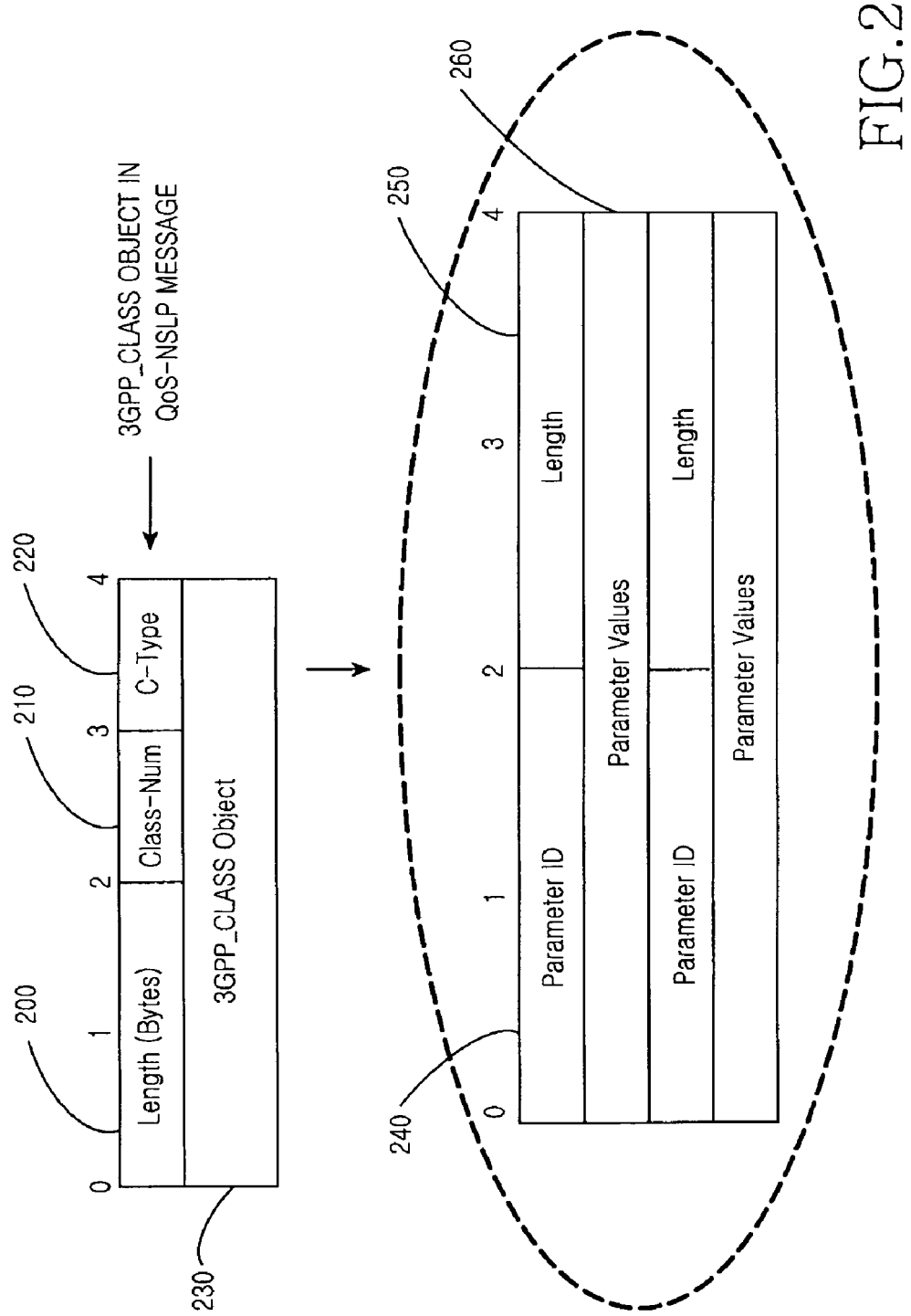
FIG. 2 is a diagram illustrating a format of a 3GPP_CLASS object defined according to an exemplary embodiment of the present invention.

FIG. 2 is a diagram illustrating a format of a 3GPP_CLASS object defined according to an exemplary embodiment of the present invention.

Figure 3:
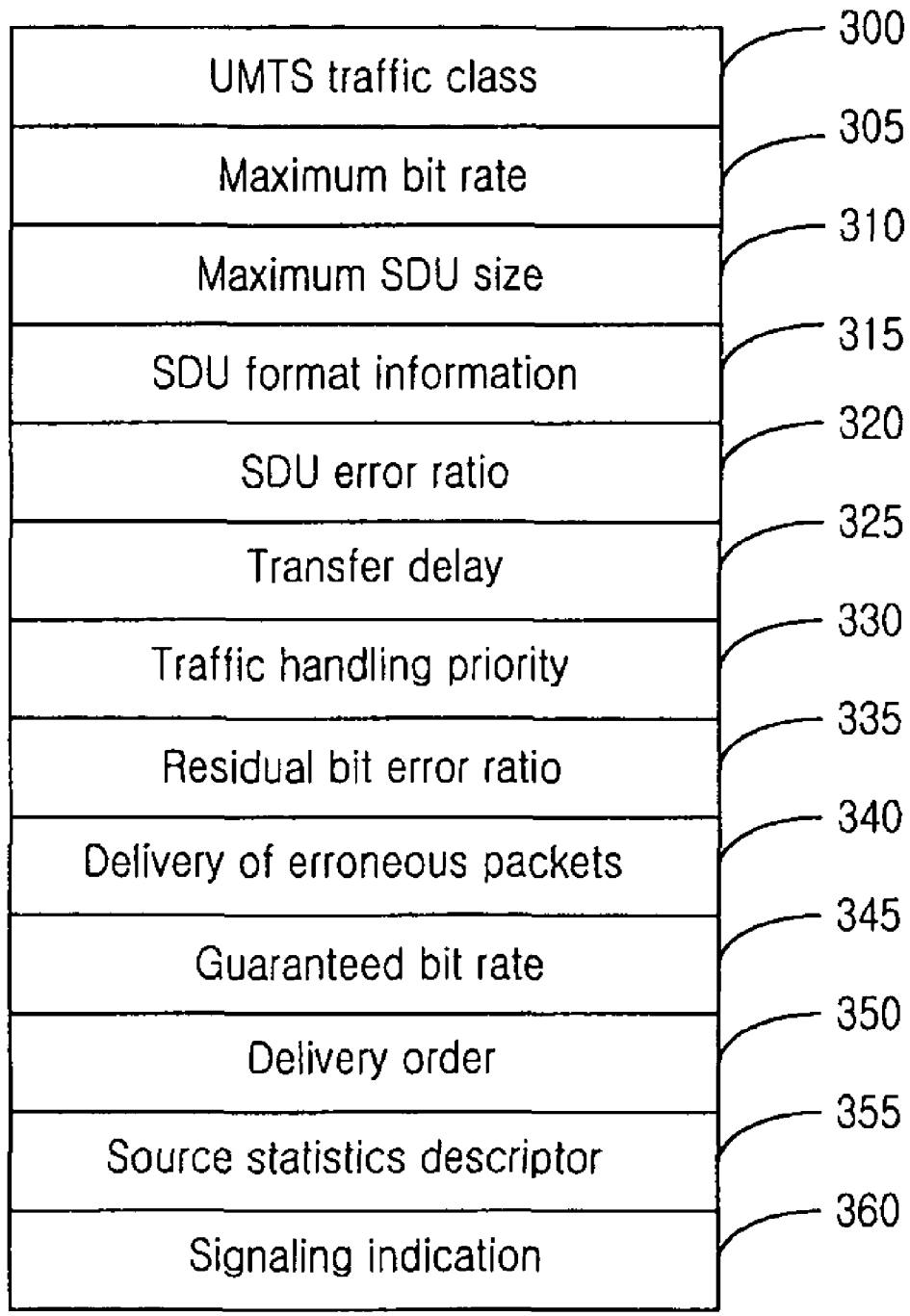
FIG. 3 is a diagram illustrating parameters defined in a 3GPP_CLASS object according to an exemplary embodiment of the present invention.

Referring to FIG. 2, a QoS-NSIS Signaling Layer Protocol (QoS-NSLP) message includes Length (Bytes) 200, Class-Num 210, C-Type 220 and 3GPP_CLASS object 230. The 3GPP_CLASS object 230 repeats the format including Parameter ID 240, Length 250, and Parameter Values 260. With reference to FIG. 3, a description will now be made of parameters defined in the 3GPP_CLASS object.

FIG. 3 is a diagram illustrating parameters defined in a 3GPP_CLASS object according to an exemplary embodiment of the present invention.

Referring to FIG. 3, a UMTS Traffic Class parameter 300 is used for indicating one of 4 UMTS Traffic Classes, and is expressed using 2 bits. A Maximum Bit Rate (Mbr) parameter 305 can be used for indicating the maximum bit rate requested by the user, and is expressed with a 32-bit IEEE floating point. A Maximum Service Data Unit (SDU) Size (MSS) parameter 310 indicates the maximum allowable SDU size, and is expressed with a 32-bit IEEE integer. The SDU Format Information (SDI) parameter 315 includes information on the SDU (codec information, relative bit priority, and the like.), and is expressed with a 32-bit IEEE integer.

Further, an SDU Error Ratio parameter 320 indicates an allowable SDU error rate, and is expressed with a 32-bit IEEE integer. A Transfer Delay parameter 325 indicates a transfer delay in the network, and is expressed with a 32-bit IEEE floating point. A Traffic Handling Priority parameter 330 can define a priority of transport traffic, and is expressed with a 32-bit IEEE integer. A Residual Bit Error Ratio (BER) parameter 335, which is used for measuring expected errors, is useful when the user defines a BER on a specific level, and is expressed with a 32-bit IEEE integer.

In addition, a Delivery of Erroneous Packets (DES) parameter 340 indicates whether to allow transport of an erroneous SDU, and can be used for rapid transport by increasing the throughput or reducing retransmissions when error correction is possible at the receiving side. This parameter is set to 1 for 'Yes', and 0 for 'No'. A Guaranteed bit rate (Gbr) parameter 345 can be used for guaranteeing the bit rate requested by the user. However, this parameter should be supported based on the policy of the service provider, and is expressed with a 32-bit IEEE floating point. A Delivery Order (DO) parameter 350 is used for indicating the possible intention that the receiving side will sequentially receive information. This parameter is set to 1 for 'Yes', and 0 for 'No'. A Source Statistics Descriptor (SSD) parameter 355 is used for analyzing a characteristic of the source and providing a service appropriate for the characteristic. For example, this parameter inserts therein a characteristic of voice traffic (used codec, peak rate, and the like) to secure resources appropriate for the characteristic. A Signaling Indication (SI) parameter 360 is used to give priority to the current transmission information when it is signaling information. This reduces a session setup delay, contributing to fast transmission of signaling messages. This parameter is set to 1 for 'Yes', and 0 for 'No'.

Figure 4:
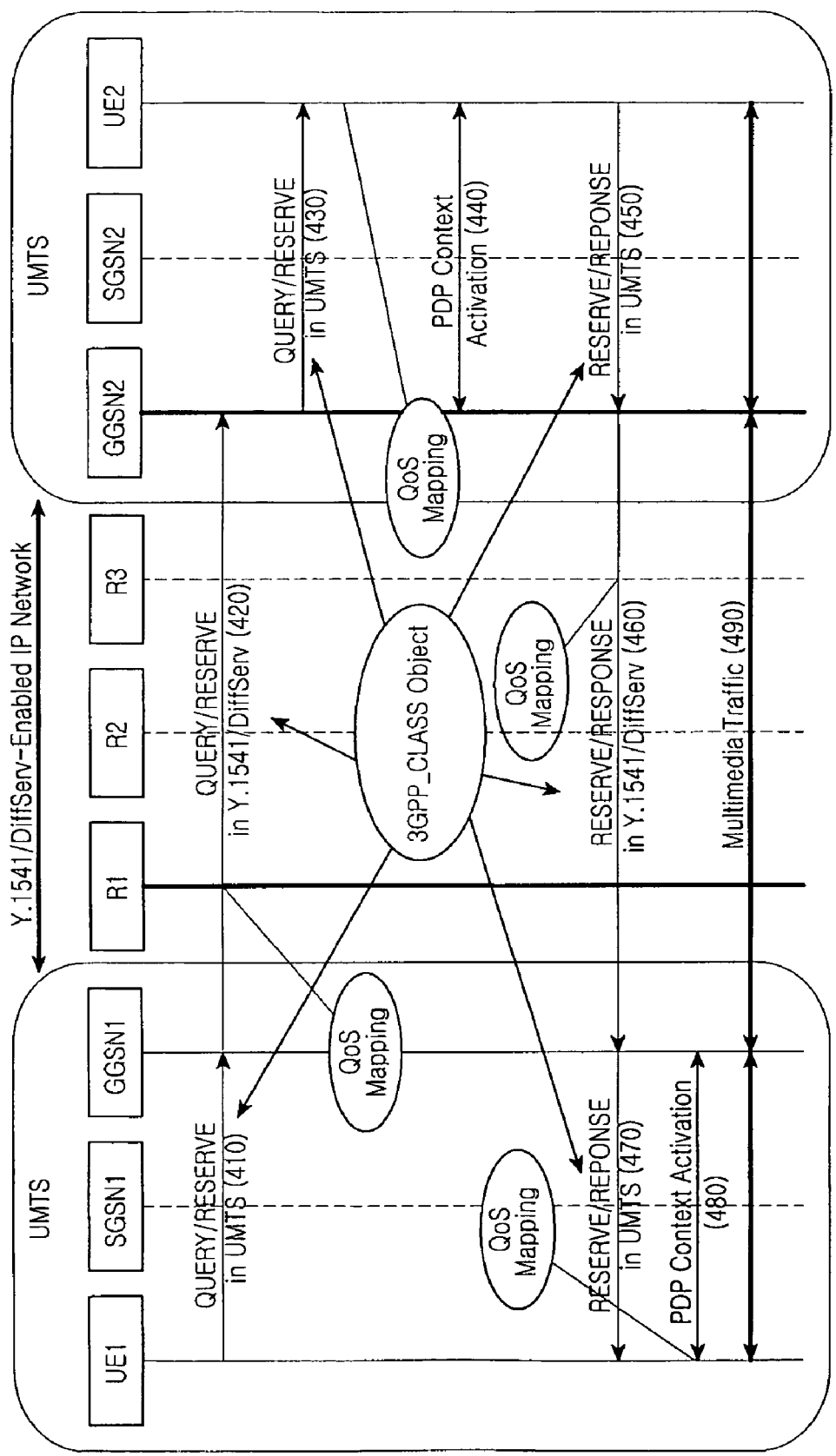
FIG. 4 is a signaling diagram illustrating a UE-initiated resource reservation process according to an exemplary embodiment of the present invention.

FIG. 4 is a signaling diagram illustrating a UE-initiated resource reservation process according to an exemplary embodiment of the present invention.

Although FIG. 4 shows both the Receiver-oriented scenario (responding to QUERY with RESERVE) and the Sender-oriented scenario (responding to RESERVE with RESPONSE), a description thereof will be made with focus on the Receiver-oriented scenario. In addition, in the exemplary embodiment of FIG. 4, an UMTS network is connected via an IP network to which Y.1541Diffserv is applied (hereinafter referred to as an "Y.1541Diffserv-based IP network"), a UE can recognize an NSIS, and a GGSN cannot recognize the NSIS.

Referring to FIG. 4, upon receipt of a QoS requirement from an upper application layer, a UE1 generates a QoS QUERY message in the UMTS network and transmits the QoS QUERY message to a GGSN1 in step 410. This QoS QUERY message carries a 3GPP_CLASS object. Then the GGSN1 delivers a QoS QUERY message to a GGSN2 via a Y.1541Diffserv-based IP network in step 420. This QoS QUERY message includes a 3GPP_CLASS object, and QoS mapping is performed in a Router1 (R1) of the Y.1541Diffserv-based IP network.

The GGSN2 delivers the QoS QUERY message received in its own UMTS network to a UE2 in step 430. This QoS QUERY message carries a 3GPP_CLASS object. Thereafter, QoS mapping is performed in the UE2. After the QoS mapping is performed, a PDP context activation process takes place between the UE2 and the GGSN2 in step 440. Thereafter, the UE2 generates a QoS RESERVE message and delivers the QoS RESERVE message to the GGSN2 in step 450. This QoS RESERVE message carries a 3GPP_CLASS object. The GGSN2 delivers a QoS RESERVE message to the GGSN1 via the Y.1541Diffserv-based IP network in step 460. This QoS RESERVE message includes a 3GPP_CLASS object, and QoS mapping is performed in a Router3 (R3) of the Y.1541Diffserv-based IP network.

The GGSN1 delivers the QoS RESERVE message received from the GGSN2 to the UE1 in step 470. This QoS RESERVE message carries a 3GPP_CLASS object. Thereafter, QoS mapping is performed in the UE1. After the QoS mapping is performed, a PDP context activation process takes place between the UE1 and the GGSN1 in step 480, securing end-to-end QoS. Thereafter, multimedia traffics are exchanged between the ends through the secured resources in step 490.

Figure 5:
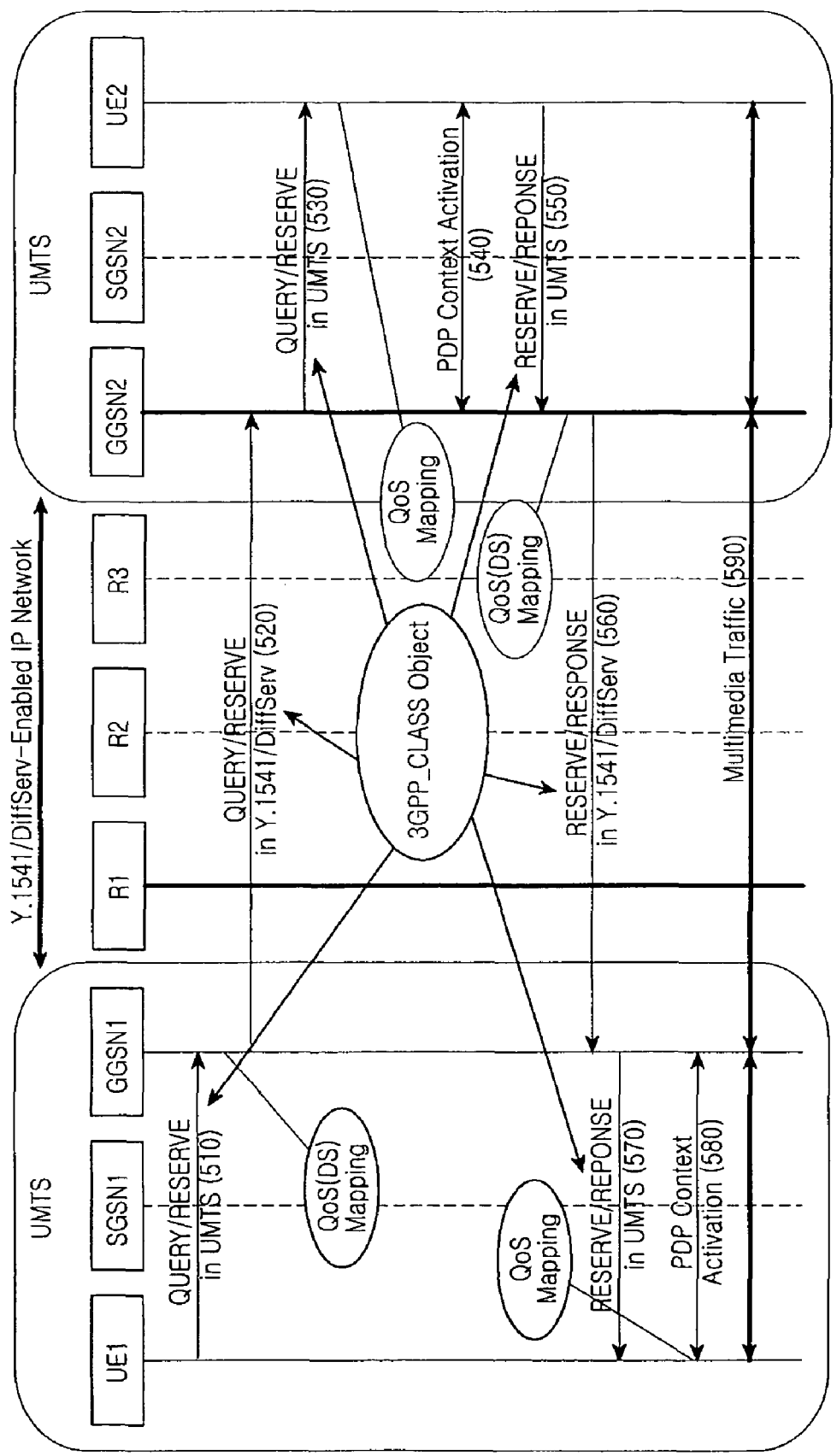
FIG. 5 is a signaling diagram illustrating a UE-initiated resource reservation process according to another exemplary embodiment of the present invention.

FIG. 5 is a signaling diagram illustrating a UE-initiated resource reservation process according to another exemplary embodiment of the present invention.

Although FIG. 5 shows both of the Receiver-oriented scenario (responding to QUERY with RESERVE) and the Sender-oriented scenario (responding to RESERVE with RESPONSE), a description thereof will be made with focus on the Receiver-oriented scenario. In addition, in the exemplary embodiment of FIG. 5, a UMTS network is connected via an Y.1541Diffserv-based IP network, and both a UE and a GGSN can recognize an NSIS.

Referring to FIG. 5, upon receipt of a QoS requirement from an upper application layer, a UE1 generates a QoS QUERY message in the UMTS network and transmits the QoS QUERY message to a GGSN1 in step 510. This QoS QUERY message carries a 3GPP_CLASS object, and DiffServ or Y.1541 QoS mapping is performed in the GGSN1. Then the GGSN1 delivers a QoS QUERY message to a GGSN2 via a Y.1541Diffserv-based IP network in step 520. This QoS QUERY message includes a 3GPP_CLASS object.

The GGSN2 delivers the QoS QUERY message received in its own UMTS network to a UE2 in step 530. This QoS QUERY message carries a 3GPP_CLASS object. Thereafter, QoS mapping is performed in the UE2. After the QoS mapping is performed, a PDP context activation process takes place between the UE2 and the GGSN2 in step 540. Thereafter, the UE2 generates a QoS RESERVE message and delivers the QoS RESERVE message to the GGSN2 in step 550. This QoS RESERVE message carries a 3GPP_CLASS object, and DiffServ or Y.1541 QoS mapping is performed in the GGSN2. The GGSN2 delivers a QoS RESERVE message to the GGSN1 via the Y.1541Diffserv-based IP network in step 560. This QoS RESERVE message includes a 3GPP_CLASS object.

The GGSN1 delivers the QoS RESERVE message received from the GGSN2 to the UE1 in step 570. This QoS RESERVE message carries a 3GPP_CLASS object. Thereafter, QoS mapping is performed in the UE1. After the QoS mapping is performed, a PDP context activation process takes place between the UE1 and the GGSN1 in step 580, securing end-to-end QoS. Thereafter, multimedia traffics are exchanged between the ends through the secured resources in step 590.

Figure 6:
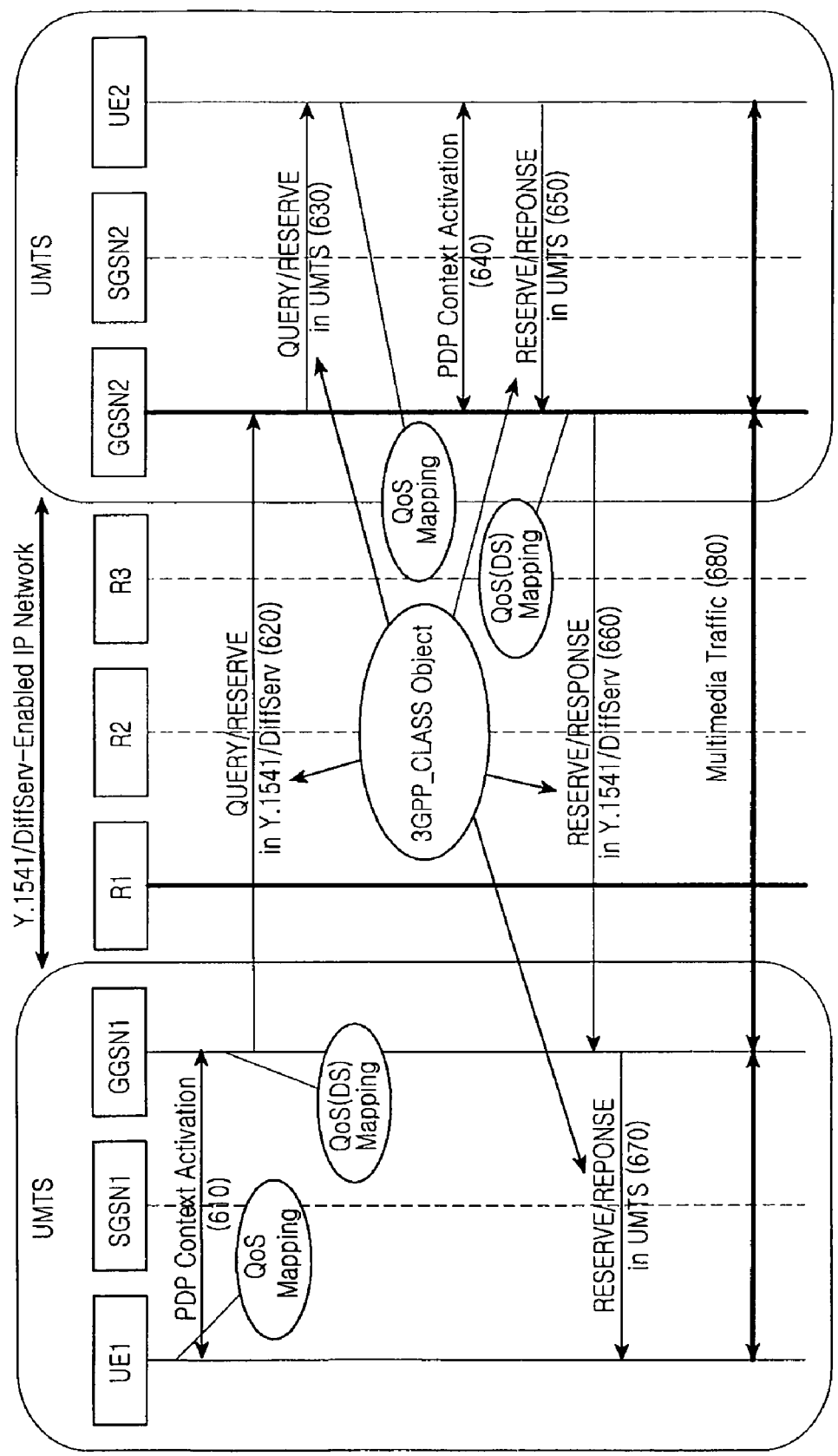
FIG. 6 is a signaling diagram illustrating a GGSN-initiated resource reservation process according to an exemplary embodiment of the present invention.

FIG. 6 is a signaling diagram illustrating a GGSN-initiated resource reservation process according to an exemplary embodiment of the present invention.

Although FIG. 6 shows both of the Receiver-oriented scenario (responding to QUERY with RESERVE) and the Sender-oriented scenario (responding to RESERVE with RESPONSE), a description thereof will be made with focus on the Receiver-oriented scenario. In addition, in the exemplary embodiment of FIG. 6, a UMTS network is connected via a Y.1541Diffserv-based IP network, and both a UE and a GGSN can recognize an NSIS.

Referring to FIG. 6, upon receipt of a QoS requirement from an upper application layer, a UE1 performs QoS mapping, and performs PDP context activation with a GGSN1 in step 610. The GGSN1 performs DiffServ or Y.1541 QoS mapping, and then delivers a QoS QUERY message to a GGSN2 via a Y.1541Diffserv-based IP network in step 620. This QoS QUERY message includes a 3GPP_CLASS object.

The GGSN2 delivers the QoS QUERY message received in its own UMTS network to a UE2 in step 630. This QoS QUERY message includes a 3GPP_CLASS object. Thereafter, QoS mapping is performed in the UE2. After the QoS mapping is performed, a PDP context activation process is performed between the UE2 and the GGSN2 in step 640. Thereafter, the UE2 generates a QoS RESERVE message and delivers the QoS RESERVE message to the GGSN2 in step 650. This QoS RESERVE message carries a 3GPP_CLASS object, and DiffServ or Y.1541 QoS mapping is performed in the GGSN2. The GGSN2 delivers a QoS RESERVE message to the GGSN1 via the Y.1541Diffserv-based IP network in step 660. This QoS RESERVE message includes a 3GPP_CLASS object.

The GGSN1 delivers the QoS RESERVE message received from the GGSN2 to the UE1, securing end-to-end QoS in step 670. Thereafter, multimedia traffics are exchanged between the ends through the secured resources in step 680.

Figure 7:
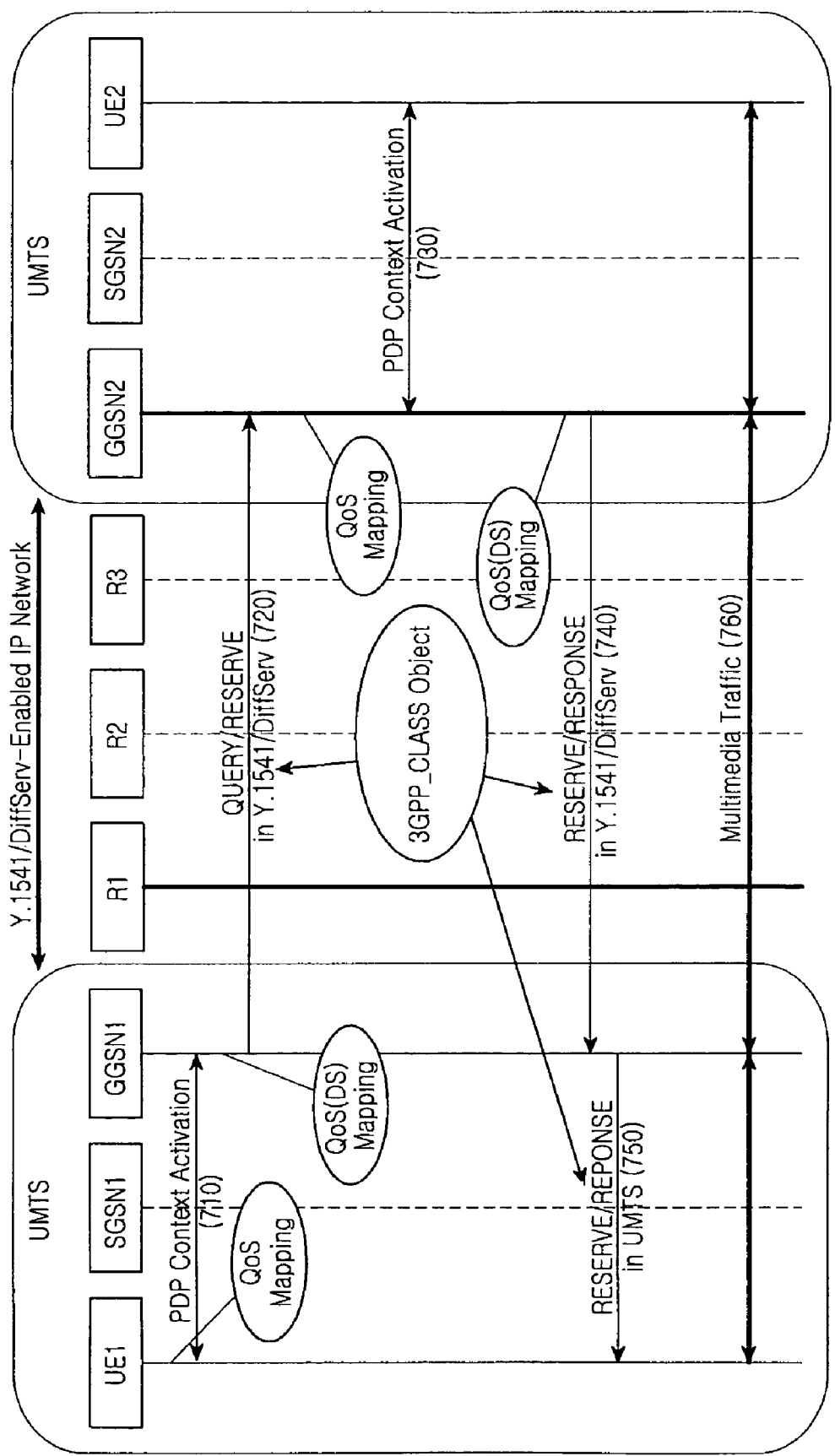
FIG. 7 is a signaling diagram illustrating a GGSN-initiated resource reservation process according to another embodiment of the present invention.

FIG. 7 is a signaling diagram illustrating a GGSN-initiated resource reservation process according to another exemplary embodiment of the present invention.

Although FIG. 7 shows both of the Receiver-oriented scenario (responding to QUERY with RESERVE) and the Sender-oriented scenario (responding to RESERVE with RESPONSE), a description thereof will be made with focus on the Receiver-oriented scenario. In addition, in the exemplary embodiment of FIG. 7, a UMTS network is connected via a Y.1541Diffserv-based IP network, and both a UE and a GGSN can recognize an NSIS.

Referring to FIG. 7, upon receipt of a QoS requirement from an upper application layer, a UE1 performs QoS mapping, and performs PDP context activation with a GGSN1 in step 710. The GGSN1 performs DiffServ or Y.1541 QoS mapping, and then delivers a QoS QUERY message to a GGSN2 via a Y.1541Diffserv-based IP network in step 720. This QoS QUERY message includes a 3GPP_CLASS object.

Thereafter, the GGSN2 performs QoS mapping. After the QoS mapping is performed, a PDP context activation process is performed between the UE2 and the GGSN2 in step 730. Thereafter, DiffServ or Y.1541 QoS mapping is performed in the GGSN2. The GGSN2 delivers a QoS RESERVE message to the GGSN1 via the Y.1541Diffserv-based IP network in step 740. This QoS RESERVE message includes a 3GPP_CLASS object.

The GGSN1 delivers the QoS RESERVE message received from the GGSN2 to the UE1, securing end-to-end QoS in step 750. Thereafter, multimedia traffics are exchanged between the ends through the secured resources in step 760.

Figure 8:
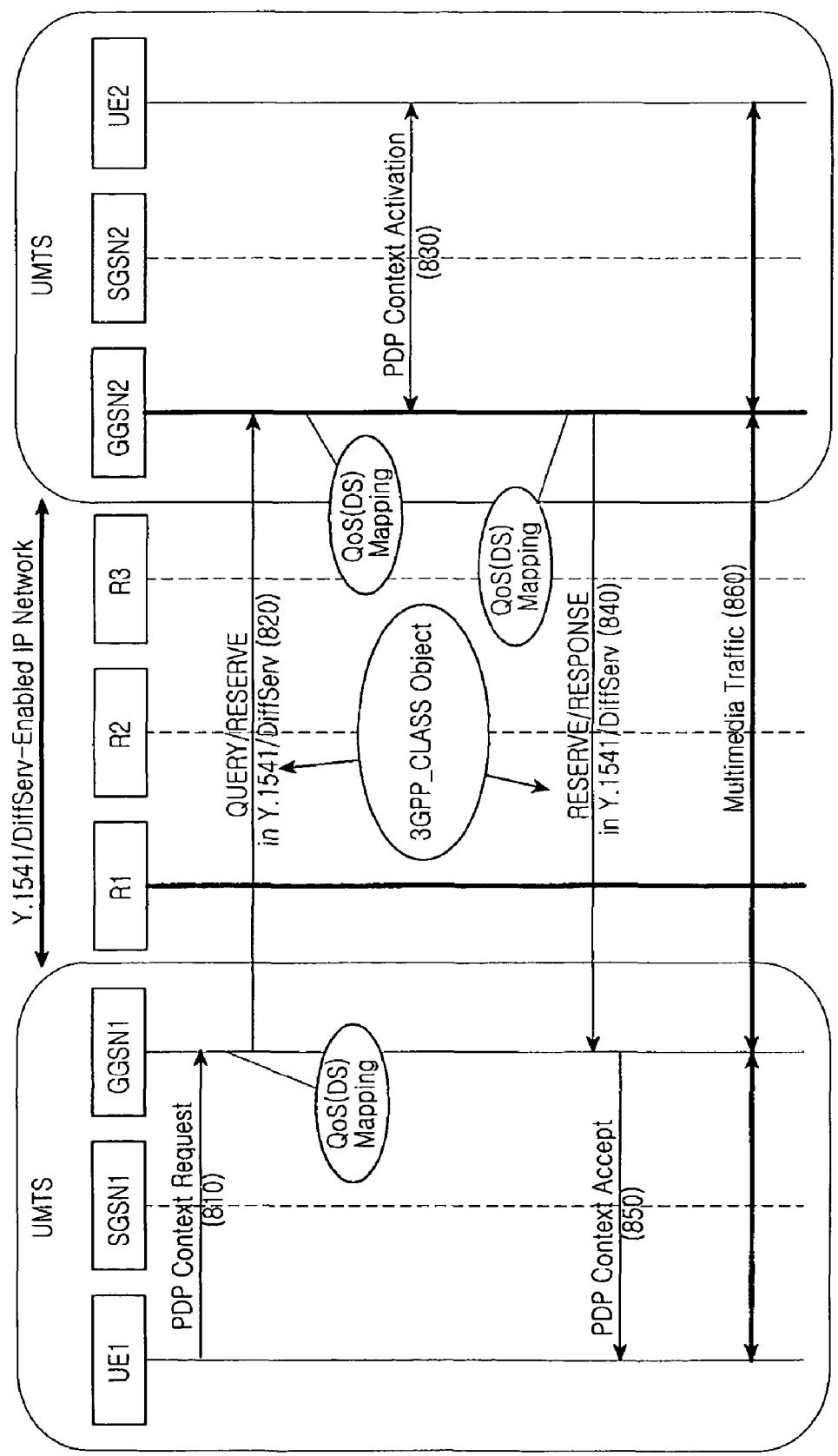
FIG. 8 is a signaling diagram illustrating a GGSN-initiated resource reservation process according to further another exemplary embodiment of the present invention.

FIG. 8 is a signaling diagram illustrating a GGSN-initiated resource reservation process according to another exemplary embodiment of the present invention.

Although FIG. 8 shows both of the Receiver-oriented scenario (responding to QUERY with RESERVE) and the Sender-oriented scenario (responding to RESERVE with RESPONSE), a description thereof will be made with focus on the Receiver-oriented scenario. In addition, in the exemplary embodiment of FIG. 8, a UMTS network is connected via an Y.1541Diffserv-based IP network, and both a UE and a GGSN can recognize an NSIS.

Referring to FIG. 8, upon receipt of a QoS requirement from an upper application layer, a UE1 performs QoS mapping, and performs PDP context request with a GGSN1 in step 810. The GGSN1 performs DiffServ or Y.1541 QoS mapping, and then delivers a QoS QUERY message to a GGSN2 via an Y.1541Diffserv-based IP network in step 820. This QoS QUERY message includes a 3GPP_CLASS object.

Thereafter, the GGSN2 performs DiffServ or Y.1541 QoS mapping. After the DiffServ or Y.1541 QoS mapping is performed, a PDP context activation process is performed between the UE2 and the GGSN2 in step 830. Thereafter, DiffServ or Y.1541 QoS mapping is performed in the GGSN2. The GGSN2 delivers a QoS RESERVE message to the GGSN1 via the Y.1541Diffserv-based IP network in step 840. This QoS RESERVE message includes a 3GPP_CLASS object.

The GGSN1 delivers a PDP Context Accept message to the UE1, securing end-to-end QoS in step 850. Thereafter, multimedia traffics are exchanged between the ends through the secured resources in step 860.

Figure 9:
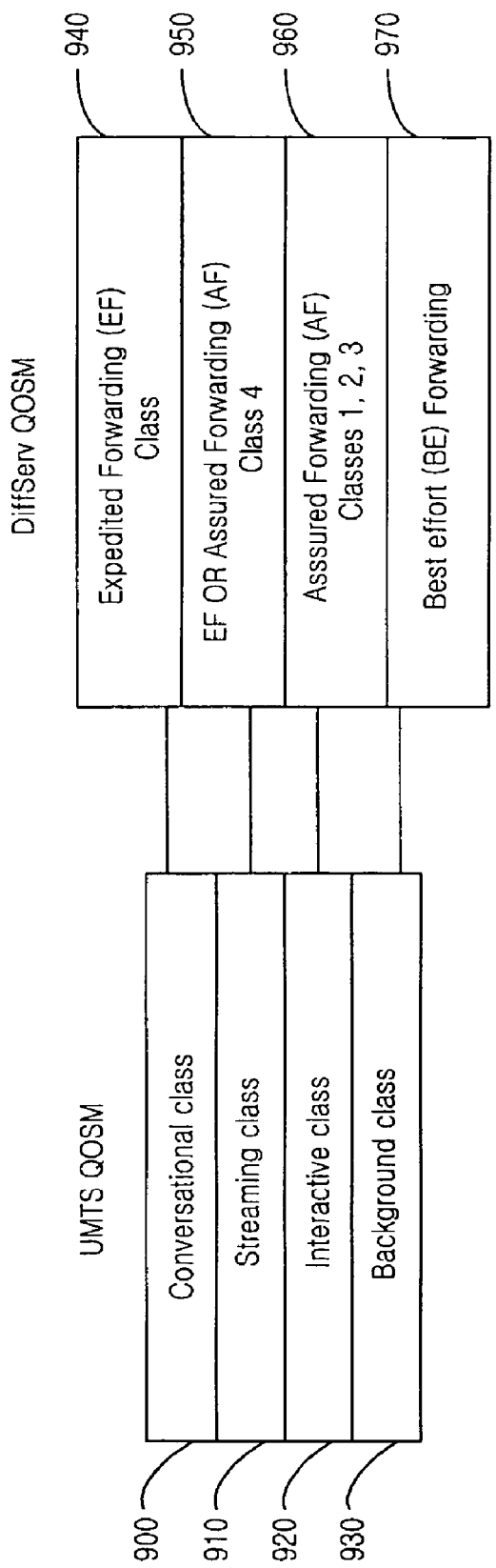
FIG. 9 is a diagram illustrating QoS class mapping for supporting interoperation between a UMTS QOSM and a DiffServ QOSM according to an exemplary embodiment of the present invention.

FIG. 9 is a diagram illustrating QoS class mapping for supporting interoperation between a UMTS QOSM and a DiffServ QOSM according to an exemplary embodiment of the present invention.

Referring to FIG. 9, the UMTS QOSM includes Conversational Class 900, Streaming Class 910, Interactive Class 920 and Background Class 930, and the DiffServ QOSM includes Expedited Forwarding (EF) Class 940, EF OR Assured Forwarding (AF) Class 4 950, Assured forwarding (AF) Classes 1, 2, 3 960 and Best effort (BE) forwarding 970.

The Conversational Class 900 is mapped to the Expedited Forwarding (EF) Class 940, the Streaming Class 910 is mapped to the EF OR Assured Forwarding (AF) Class 4 950, the Interactive Class 920 is mapped to the Assured forwarding (AF) Classes 1, 2, 3 960, and the Background Class 930 is mapped to the Best effort (BE) forwarding 970.

Figure 10:
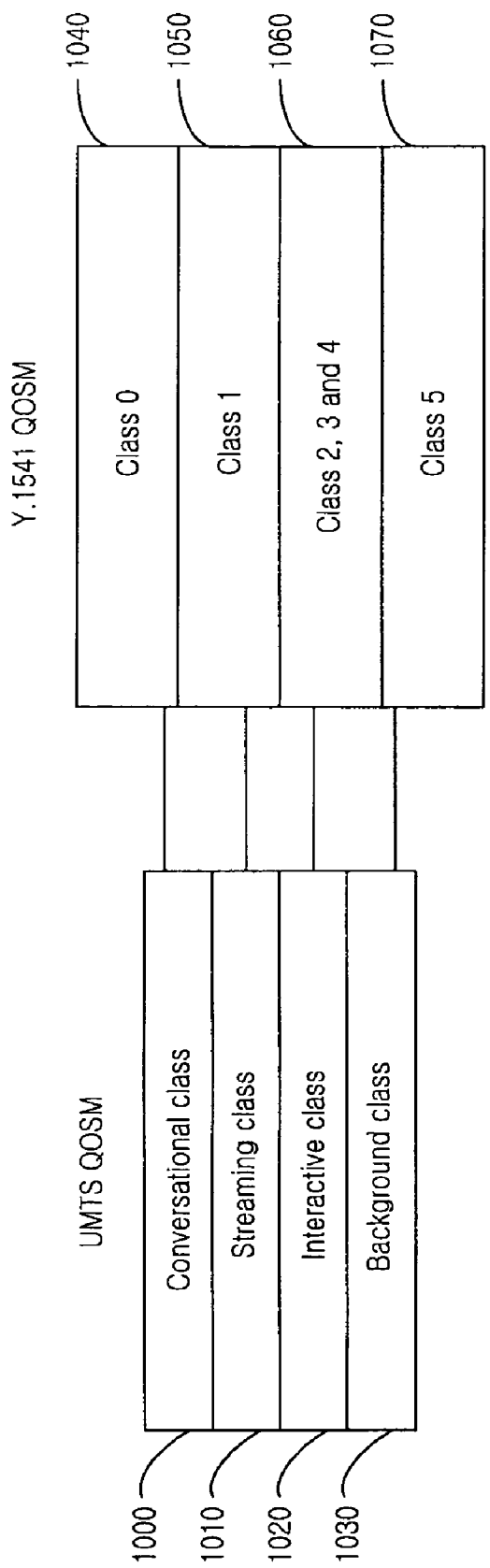
FIG. 10 is a diagram illustrating QoS class mapping for supporting interoperation between a UMTS QOSM and an Y.1541 QOSM according to an exemplary embodiment of the present invention.

FIG. 10 is a diagram illustrating QoS class mapping for supporting interoperation between a UMTS QOSM and an Y.1541 QOSM according to an exemplary embodiment of the present invention.

Referring to FIG. 10, the UMTS QOSM includes Conversational Class 1000, Streaming Class 1010, Interactive Class 1020 and Background Class 1030, and the Y.1541 QOSM includes Class 0 1040, Class 1 1050, Classes 2, 3 and 4 1060 and Class 5 1070. Herein, Classes 0 to 5 of the Y.1541 QOSM follow the contents defined in ITU-T Y.1541. The Y.1541 Classes 0 to 5 are featured by providing several network QoS classes such that they can transmit traffics having the broadly similar requirement.

The Conversational Class 1000 is mapped to the Class 0 1040, the Streaming Class 1010 is mapped to the Class 1 1050, the Interactive Class 1020 is mapped to the Classes 2, 3 and 4 1060, and the Background Class 1030 is mapped to the Class 5 1070.

Figure 11:
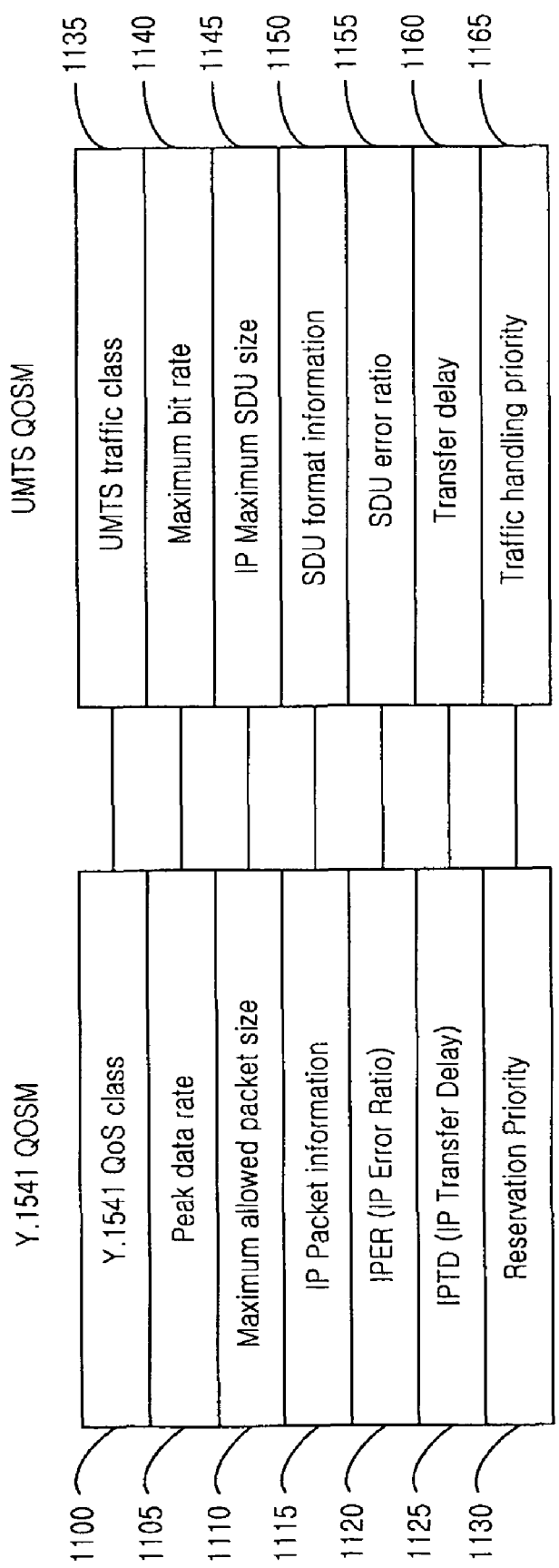
FIG. 11 is a diagram illustrating QoS parameter mapping for supporting interoperation between an Y.1541 QOSM and a UMTS QOSM according to an exemplary embodiment of the present invention.

FIG. 11 is a diagram illustrating QoS parameter mapping for supporting interoperation between an Y.1541 QOSM and a UMTS QOSM according to an exemplary embodiment of the present invention.

Referring to FIG. 11, the Y.1541 QOSM includes Y.1541 QoS class 1100, Packet data rate 1105, Maximum allowed packet size 1110, IP Packet information 1115, IPER (IP Error Ratio) 1120, IPRD (IP Transfer Delay) 1125 and Reservation Priority 1130, and the UMTS QOSM includes UMTS traffic class 1135, Maximum bit rate 1140, IP maximum SDU size 1145, SDU format information 1150, SDU error ratio 1155, Transfer delay 1160 and Traffic handling priority 1165. Herein, the parameters of the Y.1541 QOSM follow the contents defined in ITU-T Y.1541.

The Y.1541 QoS Class 1100 is mapped to the UMTS traffic Class 1135, the Packet data rate 1105 is mapped to the IP Packet information 1115, the Maximum allowed packet size 1110 is mapped to the IP maximum SDU size 1145, and the IP Packet information 1115 is mapped to the SDU format information 1150.

In addition, the IPER (IP Error Ratio) 1120 is mapped to the SDU error ratio 1155, the IPRD (IP Transfer Delay) 1125 is mapped to the Transfer delay 1160, and the Reservation Priority 1130 is mapped to the Traffic handling priority 1165.

Figure 12A:
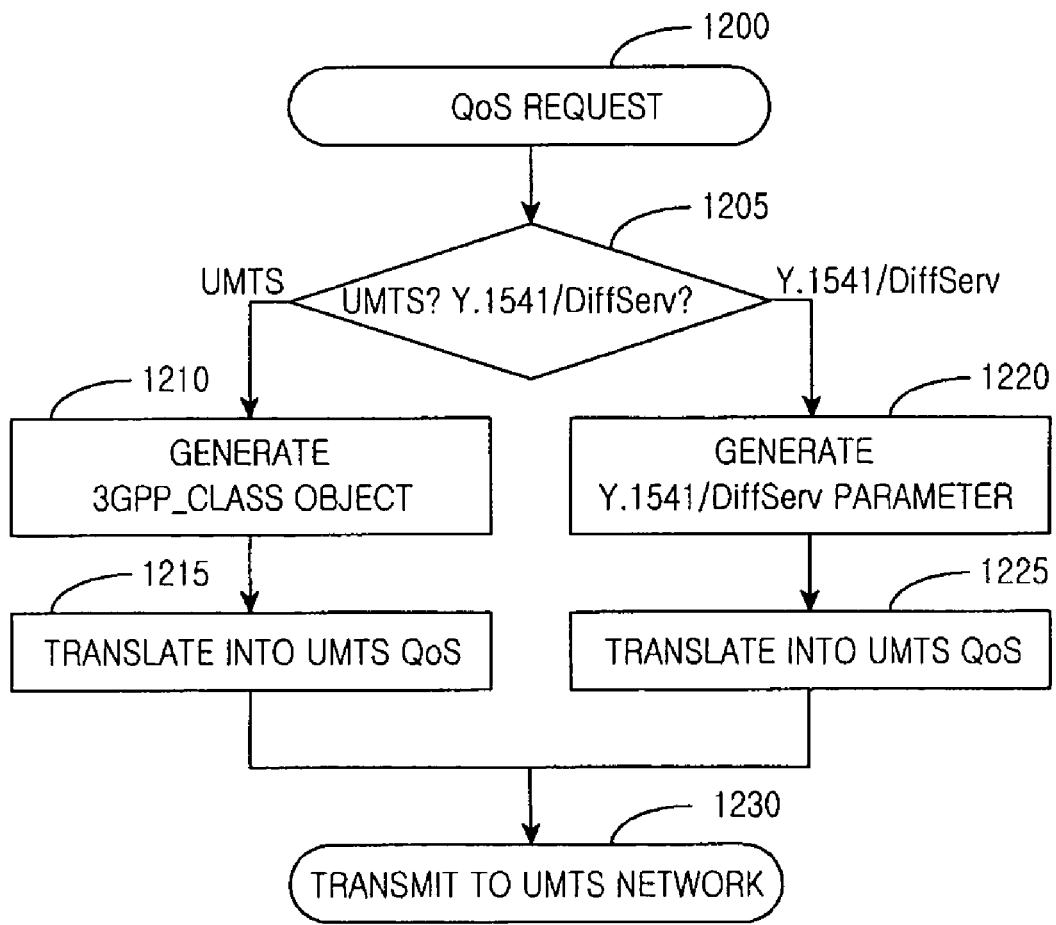
FIG. 12A is a flowchart illustrating a QoS transmission operation of a UE according to an exemplary embodiment of the present invention.

FIG. 12A is a flowchart illustrating a QoS transmission operation of a UE according to an exemplary embodiment of the present invention.

Referring to FIG. 12A, if a UE receives a QoS request from an upper layer in step 1200, it determines in step 1205 whether a corresponding QOSM is a UMTS QOSM or an Y.1541Diffserv QOSM. If it is determined that the corresponding QOSM is a UMTS QOSM, the UE generates a 3GPP_CLASS object in step 1210, and translates the 3GPP_CLASS object into parameters of a UMTS QoS class according to a mapping configuration in step 1215.

However, if it is determined that the corresponding QOSM is a Y.1541Diffserv QOSM, the UE generates Y.1541Diffserv parameters in step 1220, and translates the Y.1541Diffserv parameters into parameters of a UMTS QoS class according to a mapping configuration in step 1225. In step 1230, the LE transmits the translated UMTS QoS class to a UMTS network.

Figure 12B:
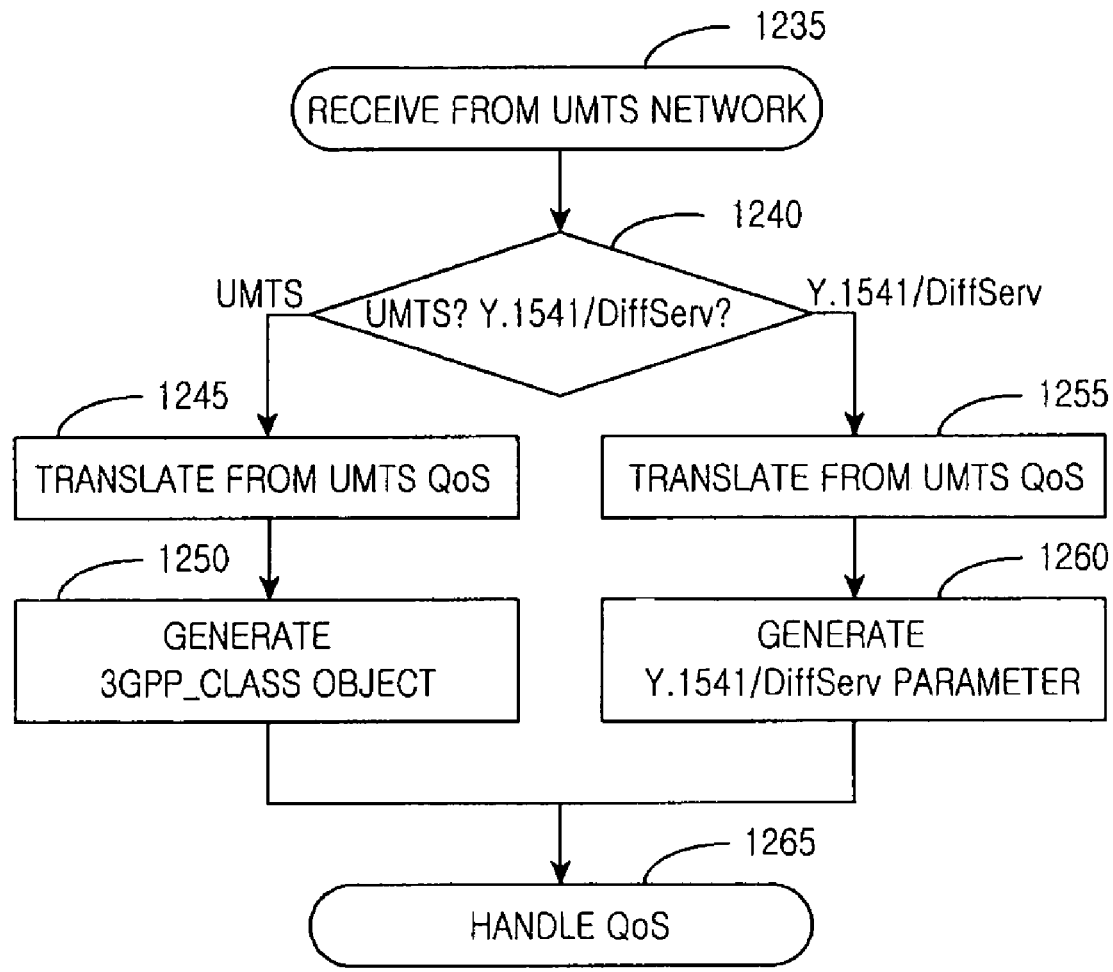
FIG. 12B is a flowchart illustrating a QoS reception operation of a UE according to an exemplary embodiment of the present invention.

FIG. 12B is a flowchart illustrating a QoS reception operation of a LE according to an exemplary embodiment of the present invention.

Referring to FIG. 12B, a UE receives a UMTS QoS class from a UMTS network in step 1235, and determines in step 1240 whether a corresponding QOSM is a UMTS QOSM or a Y.1541Diffserv QOSM. If it is determined that the corresponding QOSM is a UMTS QOSM, the UE translates parameters of a UMTS QoS class into a 3GPP_CLASS object according to a mapping configuration in step 1245, and generates a 3GPP_CLASS object in step 1250.

However, if it is determined that the corresponding QOSM is a Y.1541Diffserv QOSM, the UE translates parameters of a UMTS QoS class into Y.1541Diffserv parameters in step 1255 according to a mapping configuration, and generates Y.1541Diffserv parameters in step 1260. In step 1265, the UE performs QoS handling by analyzing the parameters received in step 1250 or 1260.

Figure 13A:
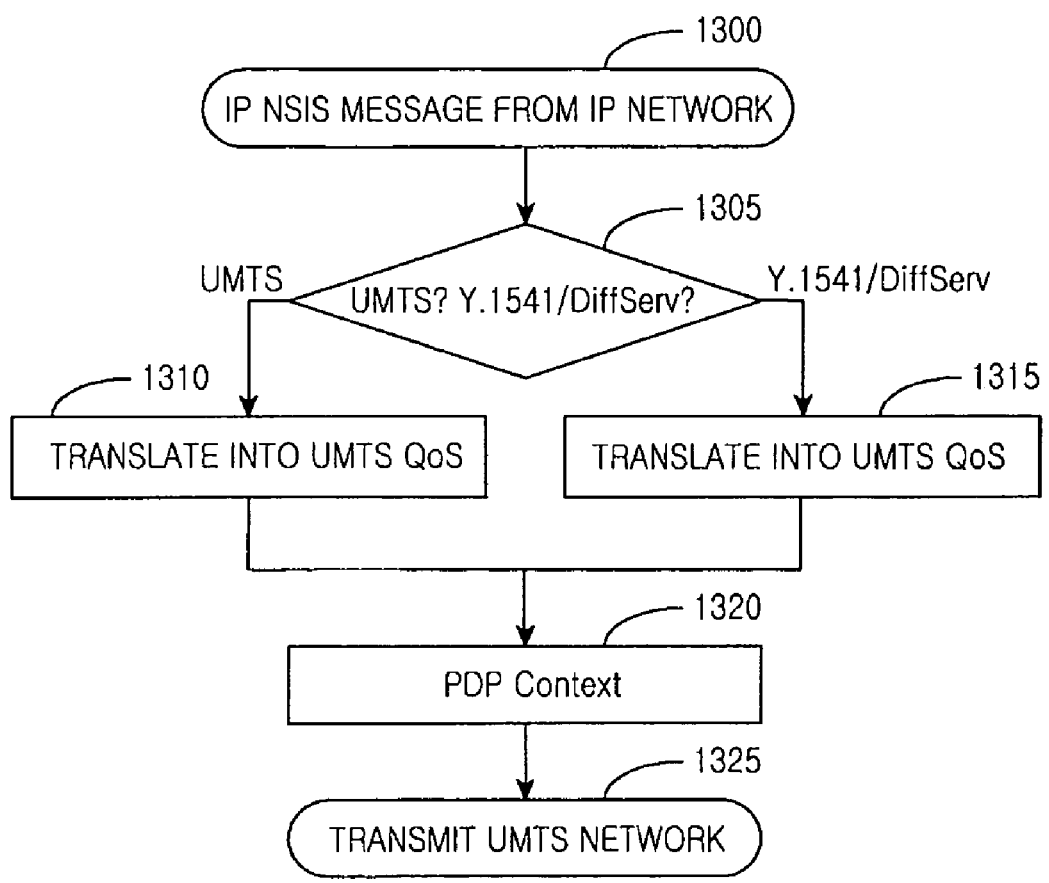
FIG. 13A is a flowchart illustrating a QoS transmission operation of a GGSN according to an exemplary embodiment of the present invention.

FIG. 13A is a flowchart illustrating a QoS transmission operation of a GGSN according to an exemplary embodiment of the present invention.

Referring to FIG. 13A, upon receipt of an NSIS message from an IP network in step 1300, a GGSN determines in step 1305 whether a corresponding QOSM is a UMTS QOSM or a Y.1541Diffserv QOSM. If it is determined that the corresponding QOSM is a UMTS QOSM, the GGSN translates an NSIS message (3GPP_CLASS object) into parameters of a UMTS QoS class according to a mapping configuration in step 1310.

If it is determined that the corresponding QOSM is a Y.1541Diffserv QOSM, the GGSN translates Y.1541Diffserv parameters into parameters of a UMTS QoS class according to a mapping configuration in step 1315. The GGSN performs a PDP context activation process in step 1320, and transmits the translated UMTS QoS class to the UMTS network in step 1325.

Figure 13B:
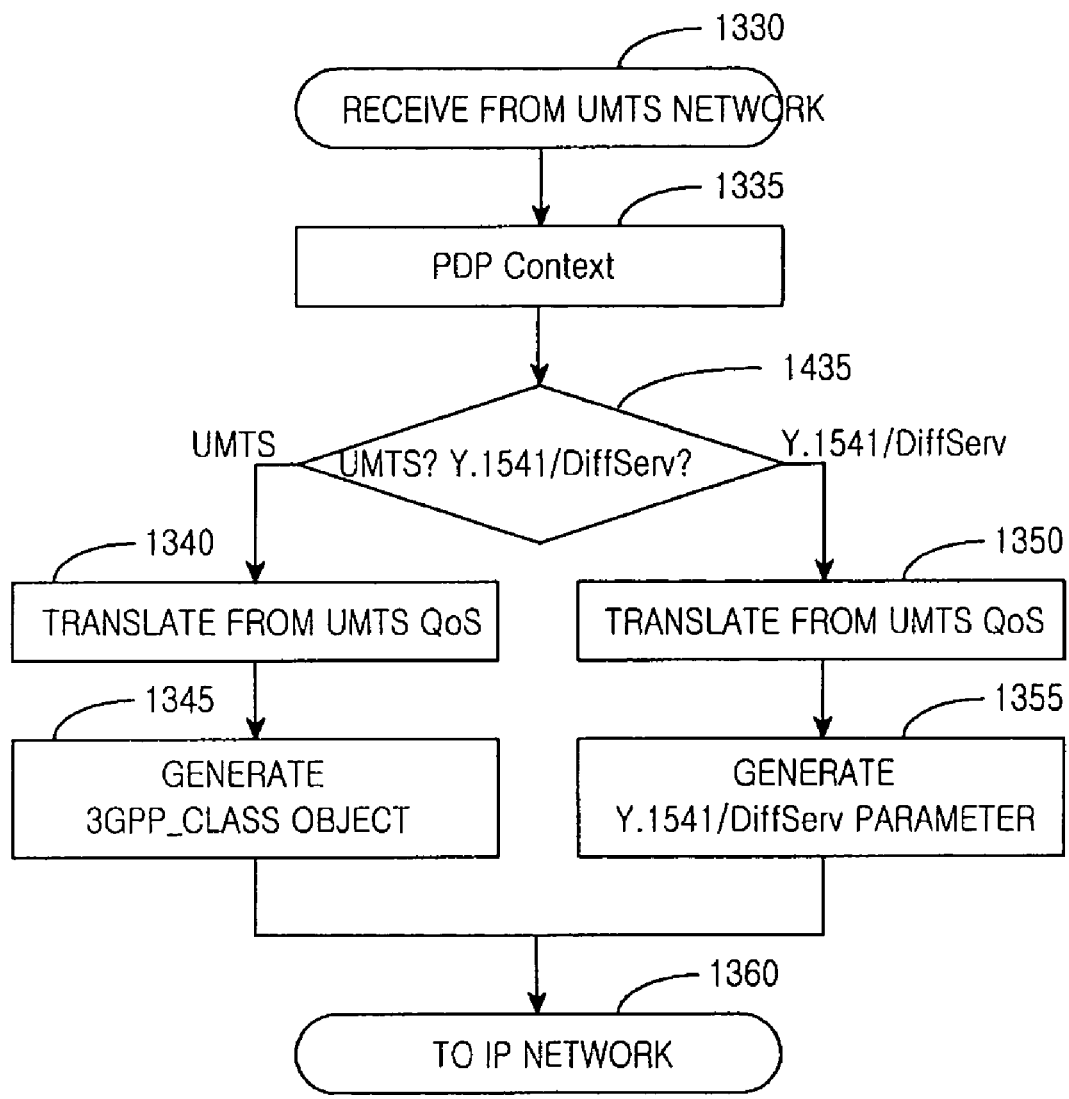
FIG. 13B is a flowchart illustrating a QoS reception operation of a GGSN according to an exemplary embodiment of the present invention.

FIG. 13B is a flowchart illustrating a QoS reception operation of a GGSN according to an exemplary embodiment of the present invention.

Referring to FIG. 13B, if a GGSN receives a UMTS QoS class from a UMTS network in step 1330, it performs a PDP context activation process in step 1435. Thereafter, the GGSN determines in step 1435 whether a corresponding QOSM is a UMTS QOSM or an Y.1541Diffserv QOSM. If it is determined that the corresponding QOSM is a UMTS QOSM, the GGSN translates parameters of a UMTS QoS class into 3GPP_CLASS parameters according to a mapping configuration in step 1340. The GGSN generates a 3GPP_CLASS object using the translated 3GPP_CLASS parameters in step 1345.

However, if it is determined that the corresponding QOSM is an Y.1541Diffserv QOSM, the GGSN translates parameters of a UMTS QoS class into 3GPP_CLASS parameters according to a mapping configuration in step 1350. The GGSN generates Y.1541Diffserv parameters using the translated 3GPP_CLASS parameters in step 1355 step 1360, the GGSN transmits the 3GPP_CLASS object or Y.1541Diffserv parameters generated in step 1345 or 1355 to the IP network.

As can be understood from the foregoing description, the present invention provides a QoS interoperation method between a 3GPP network and a non-3GPP network, for receiving a corresponding service by delivering QoS requirements to a network so as to satisfy various QoS requirements of a multimedia application in a heterogeneous network environment.

In addition, the present invention provides an interoperation method between an Y.1541 QOSM and a UMTS QOSM of ITU-T in a heterogeneous network environment, and an interoperation method between DiffServ QOSM and UMTS QOSM of IETF.

While the invention has been shown and described with reference to a certain exemplary embodiments thereof, it will be understood by those skilled in the art that various changes in form and details may be made therein without departing from the spirit and scope of the invention as defined by the appended claims and the full scope of equivalents thereof.

What is claimed is:

1. An end-to-end quality-of-service (QoS) interoperation apparatus in a heterogeneous network environment, the apparatus comprising:

a Next Steps In Signaling (NSIS) Application Programming Interface (NAPI) block for handling an NSIS API at the request of an upper layer;

an NSIS entity for handling an NSIS protocol stack at the request of the NAPI block;

an Internet Protocol Bearer Service (IP BS) manager for managing an IP BS;

a translation block for translating parameters of a Third Generation Partnership Project Class (3GPP_CLASS) object and a Universal Mobile Telecommunication System (UMTS) QoS class in an NSIS message according to a mapping configuration;

a memory for storing a software comprising a Universal Mobile Telecommunication System Bearer Service (UMTS BS) manager for managing a UMTS BS; and a processor combined with the memory, for controlling the software.

2. The end-to-end QoS interoperation apparatus of claim 1, wherein the 3GPP_CLASS object comprises:
   a UMTS Traffic Class parameter;
   a Maximum Bit Rate (Mbr) parameter;
   a Maximum Service Data Unit (SDU) Size (MSS) parameter;
   a SDU Format Information (SDI) parameter;
   a SDU Error Ratio parameter;
   a Transfer Delay parameter;
   a Traffic Handling Priority parameter;
   a Residual Bit Error Ratio (BER) parameter;
   a Delivery of Erroneous Packets (DES) parameter;
   a Guaranteed bit rate (Gbr) parameter;
   a Delivery Order (DO) parameter;
   a Source Statistics Descriptor (SSD) parameter; and
   a Signaling Indication (SI) parameter.

3. An end-to-end quality-of-service (QoS) interoperation method initiated by a first user equipment (UE), performed between a first Universal Mobile Telecommunication System (UMTS) network comprising the first UE and a first Gateway General Packet Radio Service (GPRS) Support Node (GGSN) and a second UMTS network comprising a second UE and a second GGSN via an Y.1541Diffserv-based IP network, the method comprising:

(a) generating, by the first UE upon receiving a QoS requirement from an upper application layer, a QUERY/RESERVE message comprising a Third Generation Partnership Project Class (3GPP_CLASS) object and transmitting the QUERY/RESERVE message to the first GGSN;

(b) transmitting, by the first GGSN, a QUERY/RESERVE message comprising a 3GPP_CLASS object to the second GGSN via the Y.1541Diffserv-based IP network;

(c) transmitting, by the second GGSN, the QoS QUERY/RESERVE message comprising the 3GPP_CLASS object received from the first GGSN to the second UE;

(d) performing, by the second UE, QoS mapping according to a mapping configuration, and then performing a Packet Data Protocol (PDP) context activation process with the second GGSN;

(e) generating, by the second UE, a QoS RESERVE/RESPONSE message comprising a 3GPP_CLASS object, and transmitting the QoS RESERVE/RESPONSE message to the second GGSN;

(f) transmitting, by the second GGSN, the QoS RESERVE/RESPONSE message comprising the 3GPP_CLASS object to the first GGSN;

(g) transmitting, by the first GGSN, the QoS RESERVE/RESPONSE message comprising the 3GPP_CLASS object received from the second GGSN to the first UE;

(h) performing, by the first UE, QoS mapping according to a mapping configuration, and then performing a PDP context activation process with the first GGSN, thereby securing end-to-end QoS; and (i) performing end-to-end exchange of multimedia traffic through the secured resource.

4. The end-to-end QoS interoperation method of claim 3, wherein the step (b) comprises performing QoS mapping according to a mapping configuration in a router entering the Y.1541Diffserv-based IP network if the first GGSN cannot recognize a Next Steps In Signaling (NSIS) comprising the 3GPP_CLASS object.

5. The end-to-end QoS interoperation method of claim 3, wherein the step (b) comprises performing QoS mapping according to a mapping configuration in the first GGSN if the first GGSN can recognize a Next Steps In Signaling (NSIS) comprising the 3GPP_CLASS object.

6. The end-to-end QoS interoperation method of claim 5, wherein the mapping configuration comprises:
   a Conversational Class of a UMTS QoS model (QOSM) mapped to an Expedited Forwarding (EF) Class of a DiffServ QOSM;
   a Streaming Class of the UMTS QOSM mapped to an EF or Assured Forwarding (AF) Class 4 of the DiffServ QOSM;
   an Interactive Class of the UMTS QOSM mapped to Assured Forwarding (AF) Classes 1, 2 and 3 of the DiffServ QOSM; and
   a Background Class of the UMTS QOSM mapped to a Best Effort (BE) forwarding of the DiffServ QOSM.

7. The end-to-end QoS interoperation method of claim 5, wherein the mapping configuration comprises:
   a Conversational Class of a UMTS QoS Model (QOSM) mapped to a Class 0 of an Y.1541 QOSM;
   a Streaming Class of the UMTS QOSM mapped to a Class 1 of the Y.1541 QOSM;
   an Interactive Class of the UMTS QOSM mapped to Classes 2, 3 and 4 of the Y.1541 QOSM; and
   a Background Class of the UMTS QOSM mapped to a Class 5 of the Y.1541 QOSM.

8. The end-to-end QoS interoperation method of claim 5, wherein the mapping configuration comprises:
   a Y.1541 QoS Class of a Y.1541 QoS Model (QOSM) mapped to a UMTS traffic Class of a UMTS QOSM;
   a Packet data rate of the Y.1541 QOSM mapped to an IP Packet information of the UMTS QOSM;
   a Maximum allowed packet size of the Y.1541 QOSM mapped to an IP maximum Service Data Unit (SDU) size of the UMTS QOSM;
   an IP Packet information of the Y.1541 QOSM mapped to an SDU format information of the UMTS QOSM;
   an IP Error Ratio (IPER) of the Y.1541 QOSM mapped to an SDU error ratio of the UMTS QOSM;
   an IP Transfer Delay (IPTD) of the Y.1541 QOSM mapped to a Transfer delay of the UMTS QOSM; and
   a Reservation Priority of the Y.1541 QOSM mapped to a Traffic handling priority of the UMTS QOSM.

9. The end-to-end QoS interoperation method of claim 3, wherein the step (f) comprises performing QoS mapping according to a mapping configuration in a router entering the Y.1541Diffserv-based IP network if the second GGSN cannot recognize a Next Steps In Signaling (NSIS) comprising the 3GPP_CLASS object.

10. The end-to-end QoS interoperation method of claim 3, wherein the step (f) comprises performing QoS mapping according to a mapping configuration in the first GGSN if the second GGSN can recognize an NSIS comprising the 3GPP_CLASS object.

11. The end-to-end QoS interoperation method of claim 10, wherein the mapping configuration comprises:
a Conventional Class of a UMTS QoS Model (QOSM) mapped to an Expedited Forwarding (EF) Class of a DiffSery QOSM;
a Streaming Class of the UMTS QOSM mapped to an EF or Assured Forwarding (AF) Class 4 of the DiffSery QOSM;
an Interactive Class of the UMTS QOSM mapped to Assured Forwarding (AF) Classes 1, 2 and 3 of the DiffSery QOSM; and
a Background Class of the UMTS QOSM mapped to a Best Effort (BE) forwarding of the DiffSery QOSM.

12. The end-to-end QoS interoperation method of claim 10, wherein the mapping configuration comprises:
a Conversational Class of a UMTS QoS Model (QOSM) mapped to a Class 0 of an Y.1541 QOSM;
a Streaming Class of the UMTS QOSM mapped to a Class 1 of the Y.1541 QOSM;
an Interactive Class of the UMTS QOSM mapped to Classes 2, 3 and 4 of the Y.1541 QOSM; and
a Background Class of the UMTS QOSM mapped to a Class 5 of the Y.1541 QOSM.

13. The end-to-end QoS interoperation method of claim 10, wherein the mapping configuration comprises:
a Y.1541 QoS Class of a Y.1541 QOSM mapped to a UMTS traffic Class of a UMTS QoS Model (QOSM);
a Packet data rate of the Y.1541 QOSM mapped to an IP Packet information of the UMTS QOSM;
a Maximum allowed packet size of the Y.1541 QOSM mapped to an IP maximum Service Data Unit (SDU) size of the UMTS QOSM;
an IP Packet information of the Y.1541 QOSM mapped to an SDU format information of the UMTS QOSM;
an IP Error Ratio (IPER) of the Y.1541 QOSM mapped to an SDU error ratio of the UMTS QOSM;
an IP Transfer Delay (IPTD) of the Y.1541 QOSM mapped to a Transfer delay of the UMTS QOSM; and
a Reservation Priority of the Y.1541 QOSM mapped to a Traffic handling priority of the UMTS QOSM.

14. The end-to-end QoS interoperation method of claim 3, wherein the 3GPP_CLASS object comprises:
a UMTS Traffic Class parameter;
a Maximum Bit Rate (Mbr) parameter;
a Maximum Service Data Unit (SDU) Size (MSS) parameter;
a SDU Format Information (SDI) parameter;
a SDU Error Ratio parameter;
a Transfer Delay parameter;
a Traffic Handling Priority parameter;
a Residual Bit Error Ratio (BER) parameter;
a Delivery of Erroneous Packets (DES) parameter;
a Guaranteed bit rate (Gbr) parameter;
a Delivery Order (DO) parameter;
a Source Statistics Descriptor (SSD) parameter; and
a Signaling Indication (SI) parameter.

15. An end-to-end quality-of-service (QoS) interoperation method initiated by a first Gateway General Packet Radio Service (GPRS) Support Node (GGSN), performed between a first Universal Mobile Telecommunication System (UMTS) network comprising a first user equipment (UE) and a first GGSN and a second UMTS network comprising a second UE and a second GGSN via an Y.1541Diffserv-based IP network, the method comprising:

(a) performing, by the first UE, QoS mapping according to a mapping configuration, and then performing a Packet Data Protocol (PDP) context activation process with the first GGSN;
(b) performing, by the first GGSN, QoS mapping according to a mapping configuration, and then generating a QoS QUERY/RESERVE message comprising a Third Generation Partnership Project Class (3GPP_CLASS) object and transmitting the QoS QUERY/RESERVE message to the second GGSN via the Y.1541Diffserv-based IP network;
(c) transmitting, by the second GGSN, the QoS QUERY/RESERVE message comprising the 3GPP_CLASS object received from the first GGSN to the second UE;
(d) performing, by the second UE, QoS mapping according to a mapping configuration, and then performing a PDP context activation process between the second GGSN and the first UE;
(e) generating, by the second UE, a QoS RESERVE/RESPONSE message comprising a 3GPP_CLASS object and transmitting the QoS RESERVE/RESPONSE to the second GGSN;
(f) performing, by the second GGSN, QoS mapping according to a mapping configuration, and then transmitting the QoS RESERVE/RESPONSE message comprising the 3GPP_CLASS object to the first GGSN;
(g) transmitting, by the first GGSN, the QoS RESERVE/RESPONSE message comprising the 3GPP_CLASS object received from the second GGSN to the first UE, thereby securing resources; and
(h) performing end-to-end exchange of multimedia traffic through the secured resource.

16. The end-to-end QoS interoperation method of claim 15, wherein the step (a) can be replaced by a step of sending a PDP context request from the first UE to the first GGSN.

17. The end-to-end QoS interoperation method of claim 15, wherein the step (c), the step (d) and the step (e) can be replaced by performing, by the second GGSN, QoS mapping according to a mapping configuration, and then performing a PDP context activation process with the first UE.

18. The end-to-end QoS interoperation method of claim 15, wherein the step (g) can be replaced by sending a PDP context accept from the first GGSN to the first UE.

19. The end-to-end QoS interoperation method of claim 15, wherein when the first GGSN transmits a QoS QUERY/RESERVE message comprising a 3GPP_CLASS object to the Y.1541Diffserv-based IP network or the second GGSN transmits a QoS QUERY/RESERVE message comprising a 3GPP_CLASS object to the Y.1541Diffserv-based IP network, the mapping configuration comprises:
a Conventional Class of a UMTS QoS model (QOSM) mapped to an Expedited Forwarding (EF) Class of a DiffSery QOSM;
a Streaming Class of the UMTS QOSM mapped to an EF or Assured Forwarding (AF) Class 4 of the DiffSery QOSM;
an Interactive Class of the UMTS QOSM mapped to Assured Forwarding (AF) Classes 1, 2 and 3 of the DiffSery QOSM; and
a Background Class of the UMTS QOSM mapped to a Best Effort (BE) forwarding of the DiffSery QOSM.

20. The end-to-end QoS interoperation method of claim 15, wherein when the first GGSN transmits a QoS QUERY/RESERVE message comprising a 3GPP_CLASS object to the Y.1541Diffserv-based IP network or the second GGSN transmits a QoS QUERY/RESERVE message comprising a 3GPP_CLASS object to the Y.1541Diffserv-based IP network, the mapping configuration comprises:
- a Conversational Class of a UMTS QoS Model (QOSM) mapped to a Class 0 of an Y.1541 QOSM;
- a Streaming Class of the UMTS QOSM mapped to a Class 1 of the Y.1541 QOSM;
- an Interactive Class of the UMTS QOSM mapped to Classes 2, 3 and 4 of the Y.1541 QOSM; and
- a Background Class of the UMTS QOSM mapped to a Class 5 of the Y.1541 QOSM.

21. The end-to-end QoS interoperation method of claim 15, wherein when the first GGSN transmits a QoS QUERY/RESERVE message comprising a 3GPP_CLASS object to the Y.1541Diffserv-based IP network or the second GGSN transmits a QoS QUERY/RESERVE message comprising a 3GPP_CLASS object to the Y.1541Diffserv-based IP network, the mapping configuration comprises:
- a Y.1541 QoS Class of a Y.1541 QoS Model (QOSM) mapped to a UMTS traffic Class of a UMTS QOSM;
- a Packet data rate of the Y.1541 QOSM mapped to an IP Packet information of the UMTS QOSM;
- a Maximum allowed packet size of the Y.1541 QOSM mapped to an IP maximum Service Data Unit (SDU) size of the UMTS QOSM;
- an IP Packet information of the Y.1541 QOSM mapped to an SDU format information of the UMTS QOSM;
- an IP Error Ratio (IPER) of the Y.1541 QOSM mapped to an SDU error ratio of the UMTS QOSM;
- an IP Transfer Delay (IPTD) of the Y.1541 QOSM mapped to a Transfer delay of the UMTS QOSM; and
- a Reservation Priority of the Y.1541 QOSM mapped to a Traffic handling priority of the UMTS QOSM.

22. The end-to-end QoS interoperation method of claim 15, wherein the 3GPP_CLASS object comprises:
- a UMTS Traffic Class parameter;
- a Maximum Bit Rate (Mbr) parameter;
- a Maximum Service Data Unit (SDU) Size (MSS) parameter;
- a SDU Format Information (SDI) parameter;
- a SDU Error Ratio parameter;
- a Transfer Delay parameter;
- a Traffic Handling Priority parameter;
- a Residual Bit Error Ratio (BER) parameter;
- a Delivery of Erroneous Packets (DES) parameter;
- a Guaranteed bit rate (Gbr) parameter;
- a Delivery Order (DO) parameter;
- a Source Statistics Descriptor (SSD) parameter; and
- a Signaling Indication (SI) parameter.

23. An end-to-end quality-of-service (QoS) interoperation method of a user equipment (UE) in a heterogeneous network environment, the method comprising:
- determining whether a corresponding QoS Model (QOSM) is a Universal Mobile Telecommunication System (UMTS) QOSM or an Y.1541Diffserv QOSM upon receiving a QoS request from an upper application;
- generating a Third Generation Partnership Project Class (3GPP_CLASS) object and translating the 3GPP_CLASS object into parameters of a UMTS QoS class according to a mapping configuration if the corresponding QOSM is a UMTS QOSM, and generating a Y.1541Diffserv parameter and translating the Y.1541Diffserv parameter into parameters of the UMTS QoS class according to a mapping configuration if the corresponding QOSM is an Y.1541Diffserv QOSM;
- transmitting the translated UMTS QoS class to a UMTS network;
- receiving the UMTS QoS class from the UMTS network, and determining if a corresponding QOSM is a UMTS QOSM or a Y.1541Diffserv QOSM;
- translating parameters of a UMTS QoS class into a 3GPP_CLASS object according to a mapping configuration and generating a 3GPP_CLASS object if the corresponding QOSM is a UMTS QOSM, and translating parameters of a UMTS QoS class into a Y.1541Diffserv parameter according to a mapping configuration and generating a Y.1541Diffserv parameter if the corresponding QOSM is an Y.1541Diffserv QOSM; and
- performing QoS handling by analyzing the generated parameter.

24. The end-to-end QoS interoperation method of claim 23, wherein the mapping configuration comprises:
- a Conversational Class of a UMTS QOSM mapped to an Expedited Forwarding (EF) Class of a DiffSery QOSM;
- a Streaming Class of the UMTS QOSM mapped to an EF or Assured Forwarding (AF) Class 4 of the DiffSery QOSM;
- an Interactive Class of the UMTS QOSM mapped to Assured Forwarding (AF) Classes 1, 2 and 3 of the DiffSery QOSM; and
- a Background Class of the UMTS QOSM mapped to a Best Effort (BE) forwarding of the DiffSery QOSM.

25. The end-to-end QoS interoperation method of claim 23, wherein the mapping configuration comprises:
- a Conversational Class of a UMTS QOSM mapped to a Class 0 of an Y.1541 QOSM;
- a Streaming Class of the UMTS QOSM mapped to a Class 1 of the Y.1541 QOSM;
- an Interactive Class of the UMTS QOSM mapped to Classes 2, 3 and 4 of the Y.1541 QOSM; and
- a Background Class of the UMTS QOSM mapped to a Class 5 of the Y.1541 QOSM.

26. The end-to-end QoS interoperation method of claim 23, wherein the mapping configuration comprises:
- a Y.1541 QoS Class of an Y.1541 QOSM mapped to a UMTS traffic Class of a UMTS QOSM;
- a Packet data rate of the Y.1541 QOSM mapped to an IP Packet information of the UMTS QOSM;
- a Maximum allowed packet size of the Y.1541 QOSM mapped to an IP maximum Service Data Unit (SDU) size of the UMTS QOSM;
- an IP Packet information of the Y.1541 QOSM mapped to an SDU format information of the UMTS QOSM;
- an IP Error Ratio (IPER) of the Y.1541 QOSM mapped to an SDU error ratio of the UMTS QOSM;
- an IP Transfer Delay (IPTD) of the Y.1541 QOSM mapped to a Transfer delay of the UMTS QOSM; and
- a Reservation Priority of the Y.1541 QOSM mapped to a Traffic handling priority of the UMTS QOSM.

27. The end-to-end QoS interoperation method of claim 23, wherein the 3GPP_CLASS object comprises:
- a UMTS Traffic Class parameter;
- a Maximum Bit Rate (Mbr) parameter;
- a Maximum SDU Size (MSS) parameter;
- a Service Data Unit (SDU) Format Information (SDI) parameter;
- a SDU Error Ratio parameter;
- a Transfer Delay parameter;
- a Traffic Handling Priority parameter;
- a Residual Bit Error Ratio (BER) parameter;
- a Delivery of Erroneous Packets (DES) parameter;
- a Guaranteed bit rate (Gbr) parameter;
- a Delivery Order (DO) parameter;
- a Source Statistics Descriptor (SSD) parameter; and
- a Signaling Indication (SI) parameter.

28. An end-to-end quality-of-service (QoS) interoperation method of a Gateway General Packet Radio Service (GPRS) Support Node (GGSN) in a heterogeneous network environment, the method comprising:
- determining whether a corresponding QoS Model (QOSM) is a Universal Mobile Telecommunication System (UMTS) QOSM or an Y.1541Diffserv QOSM upon receiving a Next Steps In Signaling (NSIS) message from an Internet Protocol (IP) network;
- translating a Third Generation Partnership Project Class (3GPP_CLASS) object in the NSIS message into parameters of a Universal Mobile Telecommunication System quality-of-service (UMTS QoS) class according to a mapping configuration if the corresponding QOSM is a UMTS QOSM, and translating a Y.1541Diffserv parameter into parameters of a UMTS QoS class according to a mapping configuration if the corresponding QOSM is an Y.1541Diffserv QOSM;
- performing a Packet Data Protocol (PDP) context activation process, and transmitting the translated UMTS QoS class to a UMTS network;
- upon receiving a UMTS QoS class from the UMTS network, performing a PDP context activation process;
- determining whether a corresponding QOSM is a UMTS QOSM or an Y.1541Diffserv QOSM;
- translating parameters of the UMTS QoS class into a 3GPP_CLASS parameter according to a mapping configuration and generating a 3GPP_CLASS object using the translated 3GPP_CLASS parameter if the corresponding QOSM is a UMTS QOSM, and
- translating parameters of the UMTS QoS class into a 3GPP_CLASS parameter according to a mapping configuration and generating a Y.1541Diffserv parameter using the translated 3GPP_CLASS parameter if the corresponding QOSM is an Y.1541Diffserv QOSM; and
- transmitting the generated 3GPP_CLASS object or Y.1541Diffserv parameter to the IP network.

29. The end-to-end QoS interoperation method of claim 28, wherein the mapping configuration comprises:
- a Conversational Class of a UMTS QOSM mapped to an Expedited Forwarding (EF) Class of a DiffSery QOSM;
- a Streaming Class of the UMTS QOSM mapped to an EF or Assured Forwarding (AF) Class 4 of the DiffSery QOSM;
- an Interactive Class of the UMTS QOSM mapped to Assured forwarding (AF) Classes 1, 2 and 3 of the DiffSery QOSM; and
- a Background Class of the UMTS QOSM mapped to a Best effort (BE) forwarding of the DiffSery QOSM.

30. The end-to-end QoS interoperation method of claim 28, wherein the mapping configuration comprises:
- a Conversational Class of a UMTS QOSM mapped to a Class 0 of an Y.1541 QOSM;
- a Streaming Class of the UMTS QOSM mapped to a Class 1 of the Y.1541 QOSM;
- an Interactive Class of the UMTS QOSM mapped to Classes 2, 3 and 4 of the Y.1541 QOSM; and
- a Background Class of the UMTS QOSM mapped to a Class 5 of the Y.1541 QOSM.

31. The end-to-end QoS interoperation method of claim 28, wherein the mapping configuration comprises:
- an Y.1541 QoS Class of an Y.1541 QOSM mapped to a UMTS traffic Class of a UMTS QOSM;
- a Packet data rate of the Y.1541 QOSM mapped to an IP Packet information of the UMTS QOSM;
- a Maximum allowed packet size of the Y.1541 QOSM mapped to an IP maximum Service Data Unit (SDU) size of the UMTS QOSM;
- an IP Packet information of the Y.1541 QOSM mapped to an SDU format information of the UMTS QOSM;
- an IP Error Ratio (IPER) of the Y.1541 QOSM mapped to an SDU error ratio of the UMTS QOSM;
- an IP Transfer Delay (IPTD) of the Y.1541 QOSM mapped to a Transfer delay of the UMTS QOSM; and
- a Reservation Priority of the Y.1541 QOSM mapped to a Traffic handling priority of the UMTS QOSM.

32. The end-to-end QoS interoperation method of claim 28, wherein the 3GPP_CLASS object comprises:
- a UMTS Traffic Class parameter;
- a Maximum Bit Rate (Mbr) parameter;
- a Maximum SDU Size (MSS) parameter;
- a Service Data Unit (SDU) Format Information (SDI) parameter;
- a SDU Error Ratio parameter;
- a Transfer Delay parameter;
- a Traffic Handling Priority parameter;
- a Residual Bit Error Ratio (BER) parameter;
- a Delivery of Erroneous Packets (DES) parameter;
- a Guaranteed bit rate (Gbr) parameter;
- a Delivery Order (DO) parameter;
- a Source Statistics Descriptor (SSD) parameter; and
- a Signaling Indication (SI) parameter.

* * * * *